(12) United States Patent
Beale

(10) Patent No.: US 9,084,251 B2
(45) Date of Patent: Jul. 14, 2015

(54) COMMUNICATION UNITS, INTEGRATED CIRCUITS AND METHODS FOR SUPPORTING A VIRTUAL CARRIER

(71) Applicant: General Dynamics Broadband, Inc., San Francisco, CA (US)

(72) Inventor: Martin Warwick Beale, Bristol (GB)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 138 days.

(21) Appl. No.: 13/719,812

(22) Filed: Dec. 19, 2012

(65) Prior Publication Data

US 2014/0044090 A1 Feb. 13, 2014

(30) Foreign Application Priority Data

Aug. 7, 2012 (GB) .................................. 1214137.0

(51) Int. Cl.
*H04W 4/00* (2009.01)
*H04W 72/04* (2009.01)

(52) U.S. Cl.
CPC ............ *H04W 72/042* (2013.01); *H04W 72/04* (2013.01)

(58) Field of Classification Search
CPC ... H04W 72/00; H04W 72/04; H04W 72/044; H04W 72/0446; H04W 72/0453; H04W 72/048; H04W 72/0486; H04W 72/0493; H04W 72/06; H04W 72/08
USPC .................................................. 370/329–342
See application file for complete search history.

(56) References Cited

U.S. PATENT DOCUMENTS

| 8,036,672 B2 * | 10/2011 | Laroia et al. .................. 455/450 |
| 2011/0235602 A1 * | 9/2011 | Ji et al. .......................... 370/329 |
| 2011/0268080 A1 * | 11/2011 | Luo et al. ...................... 370/330 |
| 2012/0099536 A1 * | 4/2012 | Lee et al. ....................... 370/328 |

(Continued)

FOREIGN PATENT DOCUMENTS

| GB | 2487782 | 8/2012 |
| GB | 2487906 | 8/2012 |

(Continued)

OTHER PUBLICATIONS

M.Beale, Y. Morioka. "Support of Low Complexity LTE Terminals". IEEE VTC Conference, Spring 2012, Yokohama, Japan.
M.Beale. "Future Challenges in Efficiently Supporting M2M in the LTE Standards". Internet of Things Workshop at IEEE WCNC conference, Apr. 1, 2012. Paris, France.

(Continued)

*Primary Examiner* — Kan Yuen
(74) *Attorney, Agent, or Firm* — Fitch Even Tabin & Flannery LLP

(57) ABSTRACT

A network element for controlling a usage of at least one resource is described. The network element comprises: a transmitter for transmitting a signal identifying at least one uplink resource to at least one wireless communication unit; a signal processor operably coupled to the transmitter for generating the signal; and a receiver for receiving a transmission from the at least one wireless communication unit on the identified at least one uplink resource. The signal processor is arranged to allocate the uplink resource for the at least one wireless communication unit in a first portion of a first sub-frame on a first frequency and a first portion of a second sub-frame on a second frequency wherein a time gap is allocated between an end of the first portion of the first sub-frame and a beginning of the first portion of a second sub-frame.

13 Claims, 14 Drawing Sheets

(56) References Cited

U.S. PATENT DOCUMENTS

2013/0188612 A1* 7/2013 Dinan ............................ 370/336
2014/0016610 A1* 1/2014 Susitaival et al. ............. 370/329

FOREIGN PATENT DOCUMENTS

| GB | 2487909 | 8/2012 |
| GB | 2488513 | 9/2012 |

OTHER PUBLICATIONS

M.Beale. "Making LTE a Viable M2M Platform". Presentation at Future Network Mobile Summit., Berlin. Jul. 4-6, 2012.
C.Johnson. "Long Term Evolution in Bullets" 1st edition. Published by CreateSpace. pp. 132-134.
Issues relating to switching time (for half-duplex communications) are detailed in R1-074935. 3GPP TSG RAN WG1#51 Tdoc R1-074935.Jeju, South Korea. Nov. 5-9, 2007. ftp://ftp.3gpp.org/tsg_ran/WG1_RL1/TSGR1_51/Docs/R1-074935.zip.

* cited by examiner

FIG. 1 – Prior Art

COMMUNICATION UNITS, INTEGRATED CIRCUITS AND METHODS FOR SUPPORTING A VIRTUAL CARRIER

RELATED APPLICATION(S)

This application claims the benefit of United Kingdom Application No. 1214137.0 filed Aug. 7, 2012. The content of this application is fully incorporated herein in its entirety.

DESCRIPTION

1. Field of the Invention

The of this invention relates to communication units, integrated circuits and methods for scheduling resource, and in particular for supporting physical uplink control channel signals in a low bandwidth device.

2. Background of the Invention

A recent development of third generation (3G) wireless communications is the long term evolution (LTE) cellular communication standard, sometimes referred to as a $4^{th}$ generation (4G) system. 4G systems will be deployed in existing spectral allocations owned by network operators and new spectral allocations that are yet to be licensed.

LTE devices are able to operate on carriers of bandwidth up to 20 MHz. The requirement to support a bandwidth of up to 20 MHz increases device cost in comparison to lower bandwidth systems, such as the General Packet Radio Service (GPRS). The cost of supporting high bandwidth devices has led to an increasing desire to support additional low bandwidth (and hence low cost) LTE devices within higher bandwidth carriers. In particular, UEs and corresponding base stations (often referred to as evolved NodeBs (eNodeBs) in 3GPP parlance) have been developed that utilise low bandwidth carriers operating within the bandwidth of a higher bandwidth host carrier.

Examples of devices that could beneficially use low bandwidth carriers include devices used for so-called machine type communication (MTC) applications, which are typified by semi-autonomous or autonomous wireless communication devices (i.e. MTC devices) communicating small amounts of data on a relatively infrequent basis. Examples of MTC devices include so-called smart meters, which, for example, may be located in a customer's house and periodically transmit information back to a central MTC server data relating to the customer's consumption of a utility such as gas, water, electricity and so on.

Whilst it can be convenient for a terminal such as an MTC type terminal to take advantage of the wide coverage area provided by a third or fourth generation mobile telecommunication network, there are at present disadvantages. Unlike a conventional third or fourth generation mobile terminal such as a smartphone, an MTC-type terminal is preferably relatively simple and inexpensive. The type of functions performed by the MTC-type terminal (e.g. collecting and reporting back data to the network) do not require particularly complex processing to be performed. In many scenarios, providing low capability terminals with a conventional high-performance LTE receiver unit capable of receiving and processing data from an LTE downlink frame across the full carrier bandwidth can be overly complex and expensive for a device that only needs to communicate small amounts of data.

There has been a particular interest in utilising LTE for machine type communications, as it is more spectrally efficient than the GPRS service and would allow network operators to reduce their operating costs. However a device utilising LTE is not as cost effective as a device utilising the 2.5G service (GPRS) due to the LTE requirement for the MTC terminal to operate in a high bandwidth carrier.

MTC application solution providers will be motivated to use LTE devices, which is in the interest of network operators, if the cost of LTE devices is reduced such that they are comparable in cost terms to GPRS devices. There are numerous ways of reducing the cost of LTE devices; however one of the most promising, and potentially most effective, techniques is reducing the supported bandwidth that a device can operate in. The LTE standard is currently considering use of 'virtual carriers' in order to support low bandwidth UEs, whilst concurrently maintaining the current host carrier architecture, within which the virtual carrier operates.

Virtual carriers occupy a restricted set of symbols within the sub-frame. Specifically, virtual carriers do not occupy the symbols that are used by the host carrier to transmit the host carrier's control channels, e.g. physical downlink control channel (PDCCH), physical hybrid automatic repeat request (ARQ) indicator channel (PHICH) and physical control format indicator channel (PCFICH). Instead, virtual carriers contain narrow bandwidth VC-PDCCH, VC-PHICH and VC-PCFICH control channels, where these virtual carrier control channels occupy symbols other than those occupied by the host carrier. Virtual carriers do not need to contain their own synchronization signals and UEs may use the synchronization signals transmitted by the host carrier for synchronization purposes. Additionally, virtual carriers do not need to contain a physical broadcast channel (PBCH) and UEs again may rely on the PBCH transmitted in the host carrier for the signalling of some elements of system information within a master information block. The system information for the virtual carrier may be shared with the system information for the host carrier.

In addition to the above opportunities and constraints, the use of virtual carriers may allow low bandwidth UEs to co-exist on the same carrier with legacy UEs. A legacy UE would generally need to decode control channel information across the entire channel bandwidth. As illustrated in FIG. 1, the LTE channel bandwidth can be up to 20 MHz, though other channel bandwidths such as 15 MHz, 10 MHz, 5 MHz, 3 MHz and 1.4 MHz are also supported. However, as mentioned, a low bandwidth UE would not be able to decode all the information from the entire channel bandwidth in the host carrier when a virtual carrier is used, as the low bandwidth UE will only have the capability to operate in a relatively narrow bandwidth, due to cost considerations associated with the hardware required to operate in a wider bandwidth.

FIG. 1 illustrates a schematic diagram of a sub-frame of a known host legacy carrier 100 comprising a legacy control channel region 110, legacy physical broadcast channel (PBCH) 145 and synchronization signals 105, legacy data region 135, virtual carrier 130, virtual carrier data regions 120, 125 and virtual carrier control channel region 115. FIG. 1 also shows the first sub-frame of a 10 msec. radio frame. The sixth sub-frame of the radio frame does not contain the PBCH; the other eight sub-frames of the radio frame contain neither synchronization signals nor the PBCH. Since the control channels of the host carrier occupy the entire system bandwidth, it is desirable to have a separate low bandwidth control channel region for low bandwidth UEs in order to enable both types of UE to operate on the same carrier.

As legacy UEs decode their control channels across the entire carrier bandwidth, they may therefore be scheduled physical downlink shared channel (PDSCH) resource in sub-carriers outside the bandwidth of the virtual carrier 130. In this manner the virtual carrier is effectively transparent to the legacy UEs that are scheduled in the host carrier.

It is possible to have multiple virtual carriers supported by a host legacy carrier. However, the virtual carriers can only exist in physical resources that are not occupied by the host carrier's control channels. From the viewpoint of legacy UEs that are not allocated resources in the virtual carrier, the host carrier, with the incorporated virtual carrier, is identical to the structure of a host carrier in Release 8-10 3GPP™ networks.

In current 3GPP™ releases (up to Release-10), the physical uplink control channel (PUCCH) is transmitted in a frequency distributed manner. Specifically, the PUCCH is transmitted in different subcarriers in each timeslot of the same sub-frame. Since a legacy UE's RF circuits are able to transmit across the same bandwidth that the eNodeB operates in, switching the sub-carriers that the UE uses to transmit the PUCCH (at timeslot boundaries within the sub-frame) is not an onerous task.

FIG. 1 further illustrates a schematic diagram 140 of PUCCH operation for UEs of existing Releases, e.g. Release 8-10 UEs. The schematic diagram 140 comprises a host carrier bandwidth 148 that supports at least a first sub-frame 156 comprising two timeslots 'A', 'B' 142 carrying a PUCCH signal 154 for a first UE, where the PUCCH signal 154 for a first UE is sent in a low frequency 150 in timeslot 'A' and sent in a high frequency 152 in timeslot 'B' and the PUCCH signal 144 for a second UE is sent in a high frequency 151 in timeslot 'A' and sent in a low frequency 153 in timeslot 'B'.

However for low bandwidth UEs, a problem arises as the low bandwidth UE is unable to receive in the manner shown in 140 as the low bandwidth UE is unable to receive signals or re-tune its synthesisers and other frequency-sensitive components of its RF circuits across the full bandwidth 148 from low frequency 150 to high frequency 152 from timeslot 'A' to timeslot 'B'. A legacy UE does not have this problem because its RF circuits operate across the entire carrier bandwidth 148.

One solution to the above problem that is known in the prior art is the use of an uplink virtual carrier. FIG. 1 further illustrates a schematic diagram of such an uplink virtual carrier operation of PUCCH 160 comprising PUCCH resources to be used by legacy UEs 174 and PUCCH resources to be used by a low bandwidth UE 176. The schematic diagram shows a virtual carrier that uses low frequency subcarriers 164 for some first PUCCHs in a first timeslot 162 of a sub-frame 178 and higher frequency subcarriers 166 for other second PUCCHs in a second timeslot, where the difference in frequencies between the low frequency subcarriers 164 and the higher frequency subcarriers 166 is less than the difference in frequency of the subcarriers used by the PUCCH resources for the legacy UEs 174; in the second timeslot of the sub-frame 178, the first PUCCHs use the higher frequency subcarriers and the second PUCCHs use the lower frequency subcarriers. As illustrated, the bandwidth, across which the PUCCH operates for the virtual carrier, is constrained between the subcarriers 164 and the subcarriers 166; and this bandwidth is less than the bandwidth 172 occupied by the host carrier. This reduced bandwidth of operation allows a low bandwidth UE to operate in the uplink, albeit in a narrower bandwidth than a legacy UE.

However, a problem with the proposed solution illustrated in 160 is that the bandwidth of the host carrier 174 has been fragmented, and is no longer contiguous. Therefore, first carrier region 170 and second carrier region 168 can only be applied to separate legacy UEs, and cannot be utilised by a single legacy UE.

Therefore, there is a desire to better support scheduling of resources to both legacy and low bandwidth UEs, for example with physical uplink control channel signals, for example without fragmenting the host carrier bandwidth.

SUMMARY OF THE INVENTION

The present invention provides communications units, integrated circuits and methods of scheduling of resources, for example for operating on a virtual carrier, as described in the accompanying claims. Specific embodiments of the invention are set forth in the dependent claims. These and other aspects of the invention will be apparent from and elucidated with reference to the embodiments described hereinafter.

DETAILED DESCRIPTION

Figure 2:
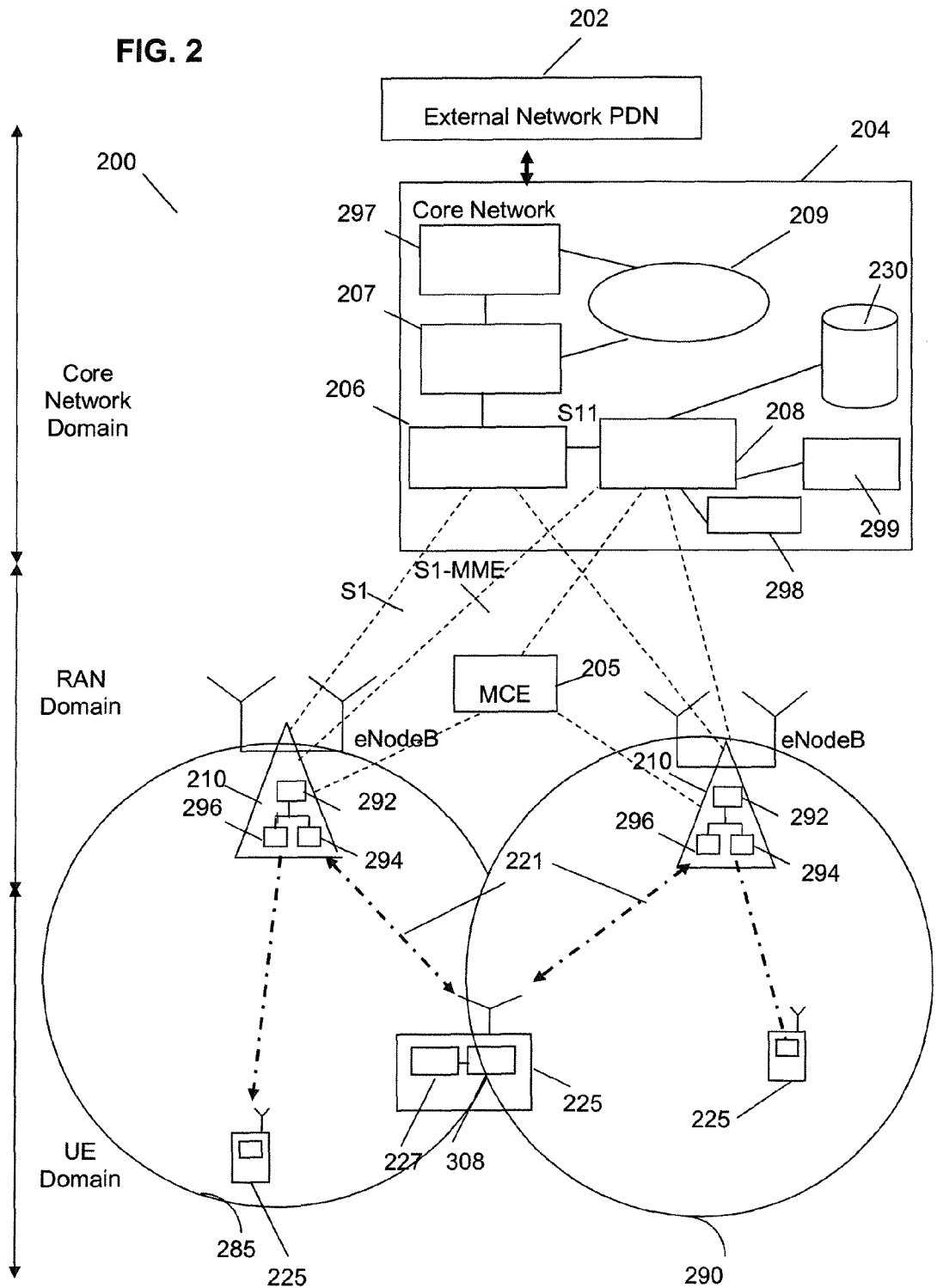
FIG. 2 illustrates a 3GPP™ LTE cellular communication system adapted in accordance with some example embodiments of the present invention.

Referring now to FIG. 2, a wireless communication system 200 is shown in outline, in accordance with one example embodiment of the invention. In this example embodiment, the wireless communication system 200 is compliant with, and contains network elements capable of operating over, a universal mobile telecommunication system (UMTS™) air-interface. In particular, the embodiment relates to a system's architecture for an Evolved-UMTS Terrestrial Radio Access Network (E-UTRAN) wireless communication system, which is currently under discussion in the third Generation Partnership Project (3GPP™) specification for long term evolution (LTE), based around OFDMA (Orthogonal Frequency Division Multiple Access) in the downlink (DL) and SC- FDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined.

The wireless communication system 200 architecture consists of radio access network (RAN) and core network (CN) elements 204, with the core network elements 204 being coupled to external networks 202 (named Packet Data Networks (PDNs)), such as the Internet or a corporate network. The CN elements 204 comprise a network element 207, which in a packet data network supporting general packet data traffic may be a packet data network gateway (P-GW), and in a Multimedia Broadcast and Multicast Service (MBMS) network providing MBMS service may be a Broadcast/Multicast Service Center (BM-SC). In order to serve up local content, the P-GW may be coupled to a content provider. The P-GW 207 may be further coupled to a policy control and rules function entity (PCRF) 297 and a Gateway 206.

The PCRF 297 is operable to control policy control decision making, as well as for controlling the flow-based charging functionalities in a policy control enforcement function PCEF (not shown) that may reside in the P-GW 207. The PCRF 297 may further provide a quality of service (QoS) authorisation class identifier and bit rate information that dictates how a certain data flow will be treated in the PCEF, and ensures that this is in accordance with a UE's 225 subscription profile.

In example embodiments, the Gateway 206 may be an MBMS or a Serving Gateway (S-GW). The Gateway 206 is coupled to a mobility management entity MME 208 via an S11 interface. The MME 208 is operable to manage session control of Gateway bearers and is operably coupled to a home subscriber server (HSS) database 230 that is arranged to store subscriber communication unit 225 (user equipment (UE)) related information.

The HSS database 230 may store UE subscription data, such as QoS profiles and any access restrictions for roaming. The HSS database 230 may also store information relating to the P-GW 207 to which a UE 225 can connect. For example, this data may be in the form of an access point name (APN) or a packet data network (PDN) address. In addition, the HSS database 230 may hold dynamic information relating to the identity of the MME 208 to which a UE 225 is currently connected or registered.

The MME 208 may be further operable to control protocols running between the user equipment (UE) 225 and the CN elements 204, which are commonly known as Non-Access Stratum (NAS) protocols. The MME 208 may support at least the following functions that can be classified as: functions relating to bearer management (which may include the establishment, maintenance and release of bearers), functions relating to connection management (which may include the establishment of the connection and security between the network and the UE 225) and functions relating to inter-working with other networks (which may include the handover of voice calls to legacy networks). The Gateway 206 predominantly acts as a mobility anchor point and is capable of providing internet protocol (IP) multicast distribution of user plane data to eNodeBs 210. The Gateway 206 may receive content via the P-GW 207, from one or more content providers 209 or via the external PDN 202. The MME 208 may be further coupled to an evolved serving mobile location centre (E-SMLC) 298 and a gateway mobile location centre (GMLC) 299.

The E-SMLC 298 is operable to manage the overall coordination and scheduling of resources required to find the location of the UE that is attached to the RAN, in this example embodiment the E-UTRAN. The GMLC 299 contains functionalities required to support location services (LCS). After performing an authorisation, it sends positioning requests to the MME 208 and receives final location estimates.

The P-GW 207 is operable to determine IP address allocation for a UE 225, as well as QoS enforcement and flow-based charging according to rules received from the PCRF 297. The P-GW 207 is further operable to control the filtering of downlink user IP packets into different QoS-based bearers (not shown). The P-GW 207 may also serve as a mobility anchor for inter-working with non-3GPP technologies such as CDMA2000 and WiMAX networks.

The Gateway 206, as discussed above, may comprise an MBMS gateway or an S-GW. If Gateway 206 comprises an MBMS gateway, an MBMS co-ordination entity (MCE) 205 may be required that would reside in the E-UTRAN between the MME 208 and the eNodeBs 210. The MCE 205 manages the layer-2 configurations and the use of the radio resources for broadcast transmission. Thus, the MCE 205 is a radio access network (RAN) domain element and can be either a separate entity (as shown) or located at the eNodeB 210. For user plane (UP) data, the BM-SC 207 is directly coupled to the eNodeBs 210 via an M1 interface.

If the Gateway 206 comprises an S-GW, the MCE 205 may not be required, and the eNodeBs 210 would be connected to the S-GW 206 and the MME 208 directly. In this case, all UE packets would be transferred through the S-GW 206, which may serve as a local mobility anchor for the data bearers when a UE 225 moves between eNodeBs 210. The S-GW 206 is also capable of retaining information about the bearers when the UE 225 is in an idle state (known as EPS connection management IDLE), and temporarily buffers downlink data while the MME 208 initiates paging of the UE 225 to re-establish the bearers. In addition, the S-GW 206 may perform some administrative functions in the visited network, such as collecting information for charging (i.e. the volume of data sent or received from the UE 225). The S-GW 206 may further serve as a mobility anchor for inter-working with other 3GPP™ technologies such as GPRS™ and UMTS™.

As illustrated, the CN 204 is operably connected to two eNodeBs 210, with their respective coverage zones or cells 285, 290 and a plurality of UEs 225 receiving transmissions from the CN 204 via the eNodeBs 210. In accordance with example embodiments of the present invention, at least one eNodeB 210 and at least one UE 225 (amongst other elements) have been adapted to support the concepts hereinafter described.

The main component of the RAN is an eNodeB (an evolved NodeB) 210, which performs many standard base station functions and is connected to the CN 204 via an S1 interface and to the UEs 225 via a Uu interface. A wireless communication system will typically have a large number of such infrastructure elements where, for clarity purposes, only a limited number are shown in FIG. 2. The eNodeBs 210 control and manage the radio resource related functions for a plurality of wireless subscriber communication units/terminals (or user equipment (UE) 225 in UMTS™ nomenclature). Each of the UEs 225 comprise a transceiver unit 227 operably coupled to signal processing logic 308 (with one UE illustrated in such detail for clarity purposes only). The system comprises many other UEs 225 and eNodeBs 210, which for clarity purposes are not shown.

As illustrated, each eNodeB 210 comprises one or more wireless transceiver unit(s) 294 that is/are operably coupled to a control processor 296 and memory 292 for storing, inter alia, information relating to UEs and UE capabilities, for example whether the UE is capable of operating as a low bandwidth UE.

In example embodiments of the invention, the network element, such as eNodeB 210, comprises functionality for controlling a usage of at least one resource. In one example, the one or more wireless transceiver unit(s) 294 of the eNodeB 210 comprise(s) a transmitter for transmitting a signal identifying at least one uplink resource to at least one wireless communication unit and a receiver for receiving a transmission from the at least one wireless communication unit on the identified at least one uplink resource. The uplink PUCCH resource is often not assigned explicitly to the at least one wireless communication unit, although in some examples it may be for example where the wireless communication unit is set up to transmit periodic CQI reports in LTE. Instead, the physical resources that were used by the PDCCH are often configured to map to the physical resources to be used for the PUCCH (for example if PDCCH used resource block 'X', the PUCCH may be configured to use physical resources 'Y', etc.).

The control processor 296 in the network element is operably coupled to the transmitter for generating the signal. In examples of the invention, the control processor 296 is arranged to allocate the uplink resource for the at least one wireless communication unit in a first portion of a first sub-frame on a first frequency and a first portion of a second sub-frame on a second frequency wherein a time gap is allocated between an end of the first portion of the first sub-frame and a beginning of the first portion of a second sub-frame, as described hereinafter with regard to later figures.

In some examples, the time gap between the first portion of the first sub-frame and the first portion of the second sub-frame may be arranged by the control processor 296 to be sufficient to enable the at least one wireless communication unit 225 to switch operation from the first frequency to the second frequency.

In some examples, the control processor 296 may generate a first signal allocating a first uplink resource for transmission to a first wireless communication unit 225 and generate a second signal allocating a second uplink resource for transmission to a second wireless communication unit.

In some examples, the control processor 296 may be further arranged to group a plurality of wireless communication units by assigning a type to the wireless communication unit, for example based at least partly on one of the following: where the relationship between resources for a first type and a second type are known a priori; where the signal processor is further arranged to define a relationship between the plurality of wireless communication units for use of at least one uplink control channel (PUCCH).

In some examples, UEs may be defined as being of type A or of type B and the term 'relationship' may encompass how the PDSCH resources for type B UEs are related to the PDSCH resources for type A UEs. In some examples, the term 'relationship' may encompass how the PUCCH resources for type B UEs are related either to the PUCCH resources for type A UEs or to the PDCCH.

In some examples, the at least one uplink resource may comprise an physical uplink control channel (PUCCH) wherein the PUCCH occupies a first timeslot, say timeslot 'X', of a first sub-frame and a second timeslot, say timeslot 'Y', of a second sub-frame, where in some examples the first timeslot and second timeslot are separated by a timeslot. Thus, in this manner, the PUCCH may be multiplexed into two timeslots, where the timeslots are separated by a time gap (such as a timeslot). In some examples, the timeslots may be in different sub-frames.

In some examples, the control processor 296 may allocate a set of subcarriers and/or timeslots in a first PUCCH resource to multiple wireless communication units, such that a plurality of wireless communication units 225 may be allocated the same relative timeslot for each subsequent sub-frame from a first set of subcarriers. In those resources, multiple UEs may be allocated PUCCH by virtue of those UEs being either frequency multiplexed (onto different subcarriers) or code multiplexed using orthogonal spreading codes.

In some examples, the control processor 296 may be further arranged to group the plurality of wireless communication units according to the wireless communication unit type based at least partly on one of the following: where the relationship between resources for a first type and a second type are known a priori; where the signal processor is further arranged to define a relationship between the plurality of wireless communication units and at least one downlink control channel (PDCCH).

In some examples, the control processor 296 may be further arranged to determine whether or not downlink data exists for the at least one wireless communication unit. A scheduler (not shown), which in some examples may be part of or coupled to the control processor 296, may allocate the PUCCH resource for the at least one wireless communication unit 225 based at least partly on determining that data exists for the at least one wireless communication unit 225. In some examples, the at least one wireless communication unit 225 (for example a UE) knows which PUCCH to use by an implicit link between the PDCCH and PUCCH (for example the scheduler may select which PUCCH to schedule and then work out which PDCCH it has to use in order to implicitly schedule that PUCCH).

Figure 3:
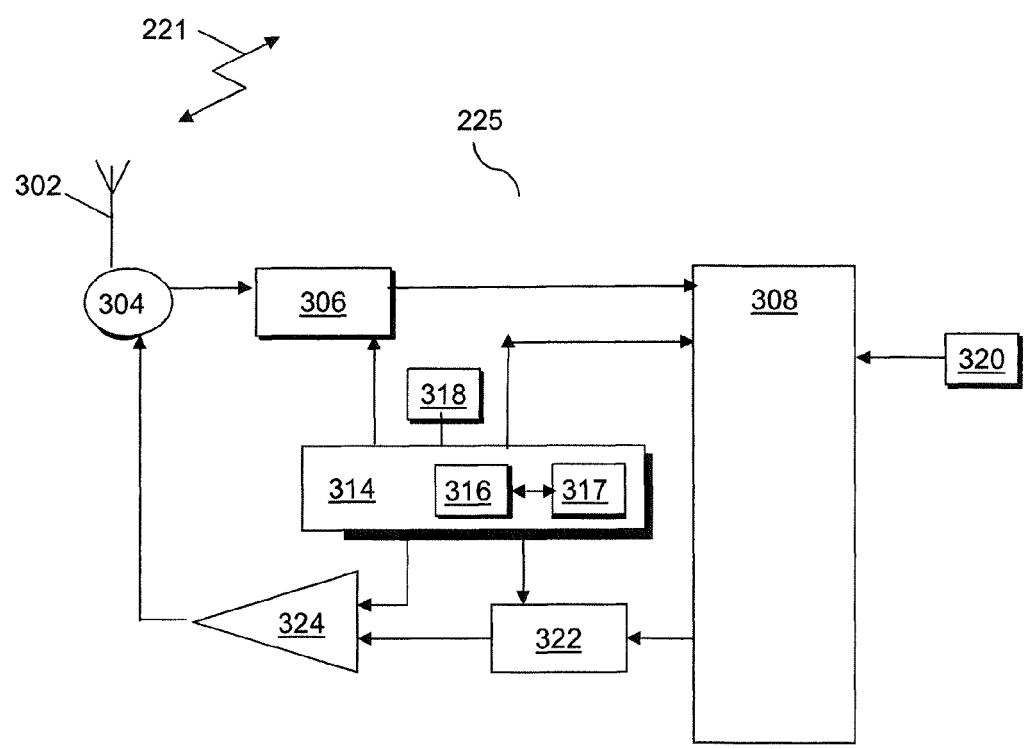
FIG. 3 illustrates a wireless communication unit adapted in accordance with some example embodiments of the present invention.

Referring now to FIG. 3, a block diagram of a wireless communication unit, adapted in accordance with some example embodiments of the invention, is shown. In practice, purely for the purposes of explaining embodiments of the invention, the wireless communication unit is described in terms of a wireless subscriber communication unit, such as a UE 225. The wireless communication unit 225 contains an antenna 302 coupled to an antenna switch or duplexer 304 that provides isolation between receive and transmit chains within the wireless communication unit 225. One or more receiver chains, as known in the art, include receiver front-end circuitry 306 (effectively providing reception, filtering and intermediate or base-band frequency conversion). The receiver front-end circuitry 306 is coupled to a signal processing module 308 (generally realized by a digital signal processor (DSP)). A skilled artisan will appreciate that the level of integration of receiver circuits or components may be, in some instances, implementation-dependent.

The controller 314 maintains overall operational control of the wireless communication unit 225. The controller 314 is also coupled to the receiver front-end circuitry 306 and the signal processing module 308. In some examples, the controller 314 is also coupled to a buffer module 317 and a memory device 316 that selectively stores operating regimes, such as decoding/encoding functions, synchronization patterns, code sequences, and the like. A timer 318 is operably coupled to the controller 314 to control the timing of operations (e.g. transmission or reception of time-dependent signals) within the wireless communication unit 225.

As regards the transmit chain, this essentially includes an input module 320, coupled in series through transmitter/modulation circuitry 322 and a power amplifier 324 to the antenna 302, antenna array, or plurality of antennas. The transmitter/modulation circuitry 322 and the power amplifier 324 are operationally responsive to the controller 314.

The signal processor module 308 in the transmit chain may be implemented as distinct from the signal processor in the receive chain. Alternatively, a single processor may be used to implement a processing of both transmit and receive signals, as shown in FIG. 3. Clearly, the various components within the wireless communication unit 225 can be realized in discrete or integrated component form, with an ultimate structure therefore being an application-specific or design selection.

Figure 4:
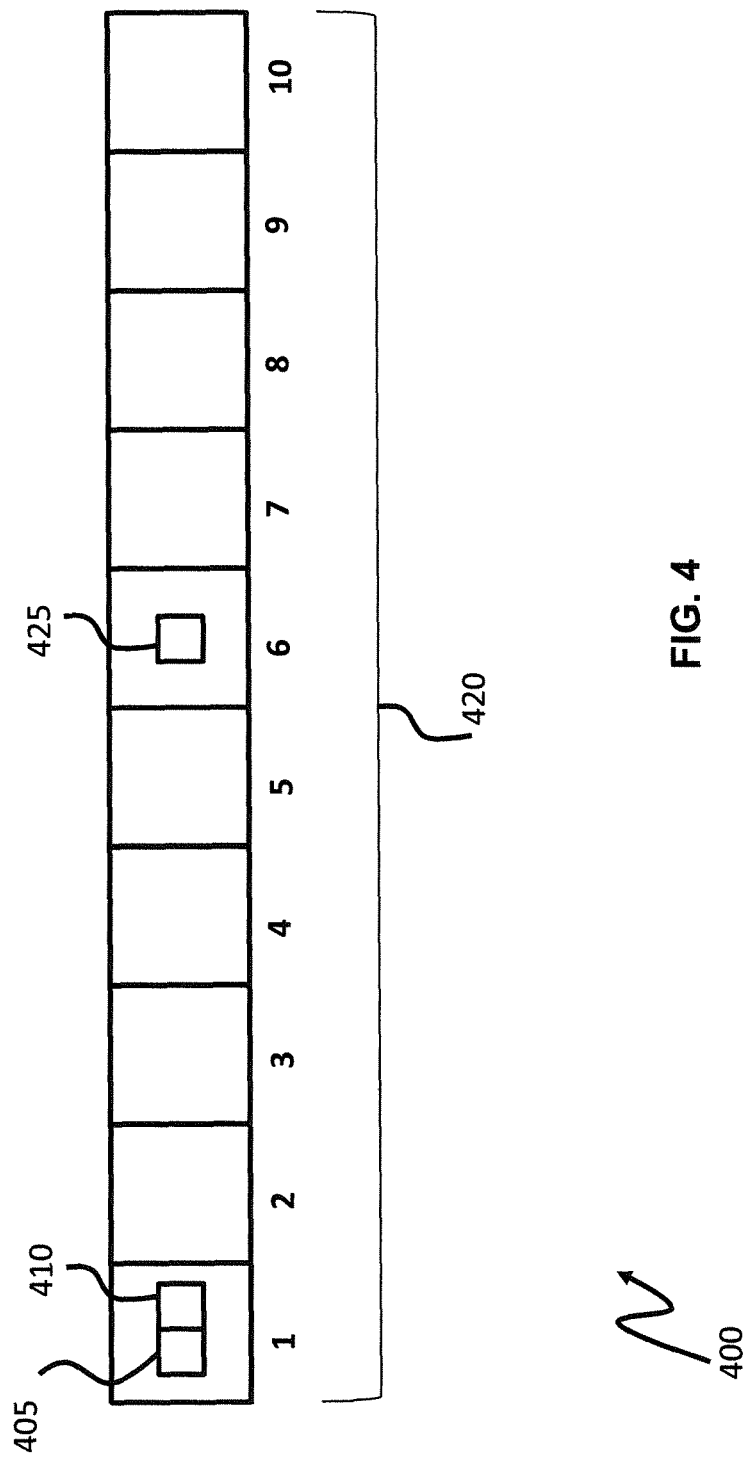
FIG. 4 illustrates a schematic diagram of an example of a conventional LTE downlink radio sub-frame.

Referring now to FIG. 4 a schematic diagram illustrating an OFDM based LTE downlink radio frame 400 is illustrated. The LTE downlink radio frame is transmitted from an LTE base station (known as an enhanced Node B) and is of 10 msec. in length. The downlink radio frame 420 comprises ten sub-frames, each sub-frame being of 1 msec. in length. A first instance of the primary synchronization signal (PSS) and a secondary synchronization signal (SSS) is transmitted in the first 405 sub-frame of the LTE frame and a second instance of the PSS and SSS is transmitted in the sixth 425 sub-frame of the LTE frame. A physical broadcast channel (PBCH) 410 is also transmitted in the first sub-frame of the LTE frame.

Figure 5:
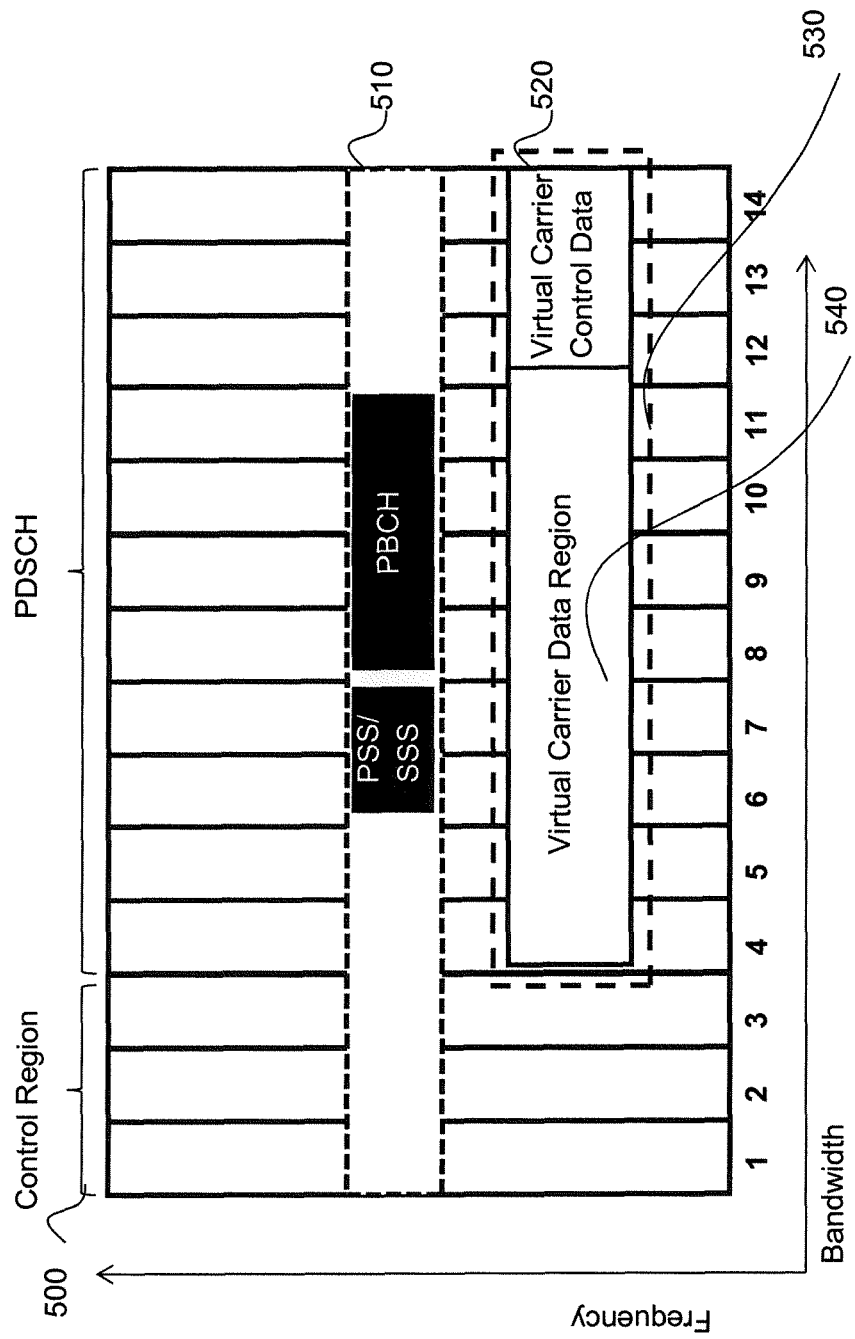
FIG. 5 illustrates a schematic diagram of the first sub-frame of an LTE downlink radio sub-frame in which a virtual carrier has been inserted.

FIG. 5 shows a schematic diagram illustrating an LTE downlink sub-frame that includes a virtual carrier inserted in a host carrier in accordance with example embodiments of the invention. In keeping with a conventional LTE downlink sub-frame, the first 'n' symbols (where 'n' is three in FIG. 5) form the control region 500, which is reserved for the transmission of downlink control data such as data transmitted on the PDCCH. However, as can be seen from FIG. 5, outside of the control region 500 the LTE downlink sub-frame includes a group of resource elements below the central band 510 that is allocated to function as a virtual carrier 530. As will become clear, the virtual carrier 530 is adapted such that data transmitted on the virtual carrier 530 can be treated as logically distinct from the data transmitted in the remaining parts of the host carrier, and can thus and advantageously be decoded without first decoding all the control data from the control region 500. Although FIG. 5 shows the virtual carrier 530 occupying frequency resources below the centre band, in other examples the virtual carrier 530 may be arranged to either occupy frequency resources above the centre band or frequency resources, including the centre band. If the virtual carrier 530 is configured to overlap any resources used by the PSS, SSS or PBCH of the host carrier, or any other signal transmitted by the host carrier that a mobile terminal operating on the host carrier would require for correct operation and expect to find in a known pre-determined location, the signals on the virtual carrier 530 can be arranged such that these aspects of the host carrier signal are maintained. The virtual carrier 530 is shown in FIG. 5 to comprise both a virtual carrier control data region 520 and a virtual carrier data region 540. The virtual carrier control data region 520 may be used to transmit control channels within the virtual carrier, such as a virtual carrier physical downlink control channel (VC-PDCCH) etc. The virtual carrier data region 540 may be used to transmit data-bearing channels, such as a virtual carrier physical downlink shared channel (VC-PDSCH).

As illustrated in FIG. 5, data transmitted on the virtual carrier 530 is transmitted across a limited bandwidth. In some examples, the virtual carrier may be arranged to encompass any suitable bandwidth, which in most examples is arranged to be smaller than that of the host carrier. In the example shown in FIG. 5 the virtual carrier 530 is transmitted across a bandwidth comprising 12 blocks of 12 sub-carriers (i.e. 144 sub-carriers), which is equivalent to a 2.16 MHz transmission bandwidth. Accordingly, a terminal receiving data transmitted on the virtual carrier need only be equipped with a receiver that is capable of receiving and processing data transmitted over a bandwidth of 2.16 MHz. This enables low capability terminals (for example MTC type terminals) to be provided with simplified receiver units and yet still be able to operate within an OFDM type communication network, which, as explained previously, conventionally requires terminals to be equipped with receivers capable of receiving and processing an OFDM signal across the entire bandwidth of the signal. In other examples, the virtual carrier may occupy 6 blocks of 12 subcarriers, leading to a virtual carrier operating in 72 sub-carriers, which is equivalent to operation in a 1.08 MHz transmission bandwidth.

As can be seen in FIG. 5, the final symbols of the virtual carrier 530 can be reserved as a virtual carrier control region 520, which is allocated for the transmission of hybrid ARQ acknowledgements via a VC-PHICH, PDSCH allocations via a VC-PDCCH, the number of symbols occupied by the virtual carrier control region via a VC-PCFICH, and the number of symbols occupied by the host control channel region via a VC-PCFICH2. In some examples the number of symbols comprising the virtual carrier control region 520 may be fixed, for example three symbols. In other examples the virtual carrier control region 520 may vary in size, for example between one and three symbols.

In some examples, the virtual carrier control region 520 may be located at any suitable position within the virtual carrier 530, for example in the first few symbols of the virtual carrier 530. In the example of FIG. 5, this may mean locating the virtual carrier control region 520 on the fourth, fifth and sixth symbols. However, fixing the position of the virtual carrier control region 520 in the final symbols of the sub-frame may provide an advantage as the position of the virtual carrier control region 520 need not vary, even if the number of symbols of the host carrier control region varies. This simplifies the processing undertaken by wireless subscriber units, such as UEs, receiving data on the virtual carrier because there is no need for them to determine the position of the virtual carrier control region every sub-frame as it is known that it will always be positioned in the final symbols of the sub-frame. Furthermore, some virtual carrier control channels (e.g. the VC-PHICH, VC-PDCCH and VC-PCFICH) may occupy the first few symbols of the virtual carrier, whereas other virtual carrier control channels, e.g. the VC-PCFICH2, may occupy the final symbols of the virtual carrier.

In some examples the virtual carrier may be located within the centre frequency band 510 of the downlink sub-frame. In this manner, a reduction in host carrier PDSCH resources caused by the insertion of one or more virtual carriers may be minimised, since the resources occupied by the PSS/SSS and PBCH would be contained within the virtual carrier region and not the host carrier PDSCH region. Therefore, depending on, for example, the expected virtual carrier throughput, the location of a primary virtual carrier can be appropriately chosen to either exist inside or outside the centre band according to whether the host or primary virtual carrier is chosen to bear the overhead of the PSS, SSS and PBCH.

Figure 6:
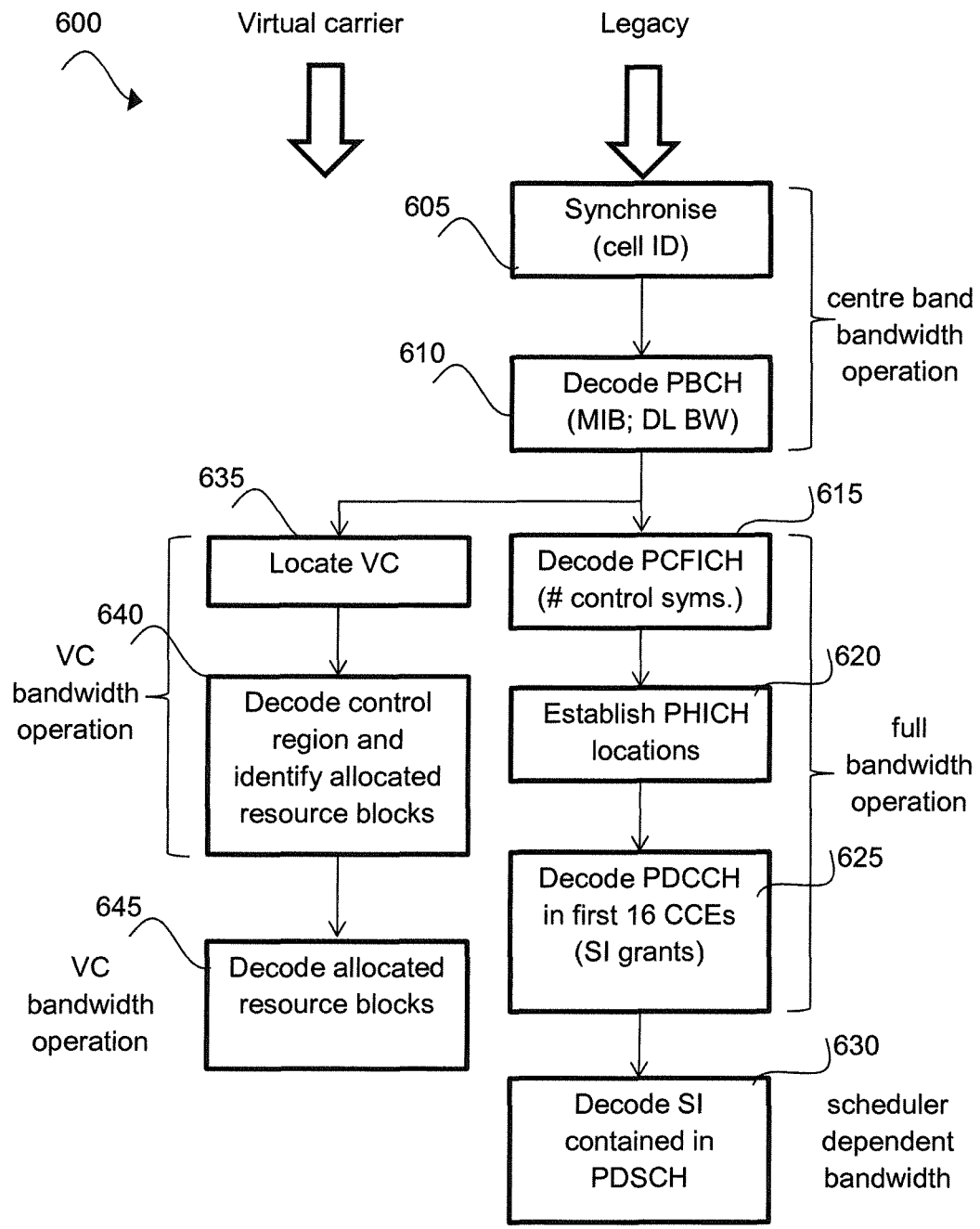
FIG. 6 illustrates a schematic diagram of an example of an adapted LTE 'camp-on' procedure for camping on to a virtual carrier.

Referring now to FIG. 6, a flowchart 600 of example procedures for both a low bandwidth UE to camp on to a virtual carrier and for a conventional legacy UE to camp-on to a host carrier is shown in outline.

In a conventional legacy camp-on procedure, the full or low bandwidth wireless subscriber unit, such as a full or low bandwidth UE, first synchronizes with the base station, such as an eNodeB, as shown in 605. The full or low bandwidth UE uses the PSS and SSS located, for example, in a generally central frequency region of the host carrier, e.g. the central region 510 of the host carrier of FIG. 5, as mentioned above, to synchronize with the network, as shown in 605. In one example, the low bandwidth UE and legacy full bandwidth UE detect the PSS and SSS in the centre band and from these signals determine the cyclic prefix duration and the Cell ID. In LTE the PSS and SSS are only transmitted in the first and sixth sub-frames of each radio frame. In a different system, for example a non-LTE system, the generally central frequency region may not be at the centre of the host carrier control region and may be wider or narrower than the 72 sub-carriers or 1.08 MHz as used in LTE. Likewise, the sub-frames may be of a different size or sizes.

The low bandwidth UE or legacy full bandwidth UE then decodes the PBCH in 610, which in one example is also carried on the generally central frequency region of the host carrier control region, e.g. the central region 510 of FIG. 5, where the PBCH includes in particular the Master Information Block (MIB). The MIB indicates in particular the bandwidth of the downlink carrier, the most significant bits of the System Frame Number (SFN), and the PHICH configuration. Using the MIB carried on the PBCH, the low bandwidth UE or legacy full bandwidth UE may then be made aware of the bandwidth of the carrier. As the full or low bandwidth UE also knows where the generally central frequency region of the host carrier control region is, the full or low bandwidth UE knows the exact range of subcarriers occupied by the downlink carrier.

For each sub-frame, the legacy full bandwidth UE then decodes the PCFICH, in 615, which is distributed across the entire bandwidth of the carrier. As discussed above, an LTE downlink carrier can be up to 20 MHz wide (1200 sub-carriers) and an LTE full bandwidth UE therefore has to have the capability to receive and decode transmissions on a 20 MHz bandwidth in order to decode the PCFICH. At that stage, with a 20 MHz carrier band, the full bandwidth UE operates at a much larger bandwidth than during 605 and 610 relating to synchronization and PBCH decoding.

The legacy full bandwidth UE then establishes the PHICH locations in 620 and decodes the PDCCH in 625, in particular for identifying system information transmissions and for identifying its personal allocation grants. The allocation grants are used by the legacy full bandwidth UE to locate system information and to locate the full bandwidth UE's data in the PDSCH.

At 615 to 625, the legacy full bandwidth UE decodes information contained in the control region, say control region 500 of FIG. 5, of a sub-frame. As explained above, in LTE, the three (PCFICH, PHICH and PDCCH) control channels are located across the control region of the carrier where the control regions extends over the system bandwidth and occupies the first one, two or three orthogonal frequency division multiplex (OFDM) symbols of each sub-frame. In a sub-frame, typically the (PCFICH, PHICH and PDCCH) control channels do not use all the resource elements within the control region, but they are scattered across the entire region, such that a legacy LTE full bandwidth UE has to be able to simultaneously receive the entire control region 500 for decoding each of the three (PCFICH, PHICH and PDCCH) control channels. The legacy full bandwidth UE is then able to decode the PDSCH in 630 that contains system information or data transmitted for this full bandwidth UE.

In contrast, and referring now to a low bandwidth UE operating generally on virtual carriers, the low bandwidth UE's operation changes after 610 to locate the primary virtual carrier as shown in 635. Prior to 635, the low bandwidth UE may determine the location of the primary virtual carrier by decoding the MIB (transmitted on the PBCH) in step 610. The low bandwidth UE camping on the cell to receive data on the virtual carrier decodes the control region on the primary virtual carrier and identifies resource blocks that have been allocated to it, in 640. The low bandwidth UE can then decode the PDSCH resource blocks that have been allocated to it or the system information, in 645. The system information may occupy the same resource blocks as the host carrier or may occupy specific resource blocks for the low bandwidth UE.

Figure 7:
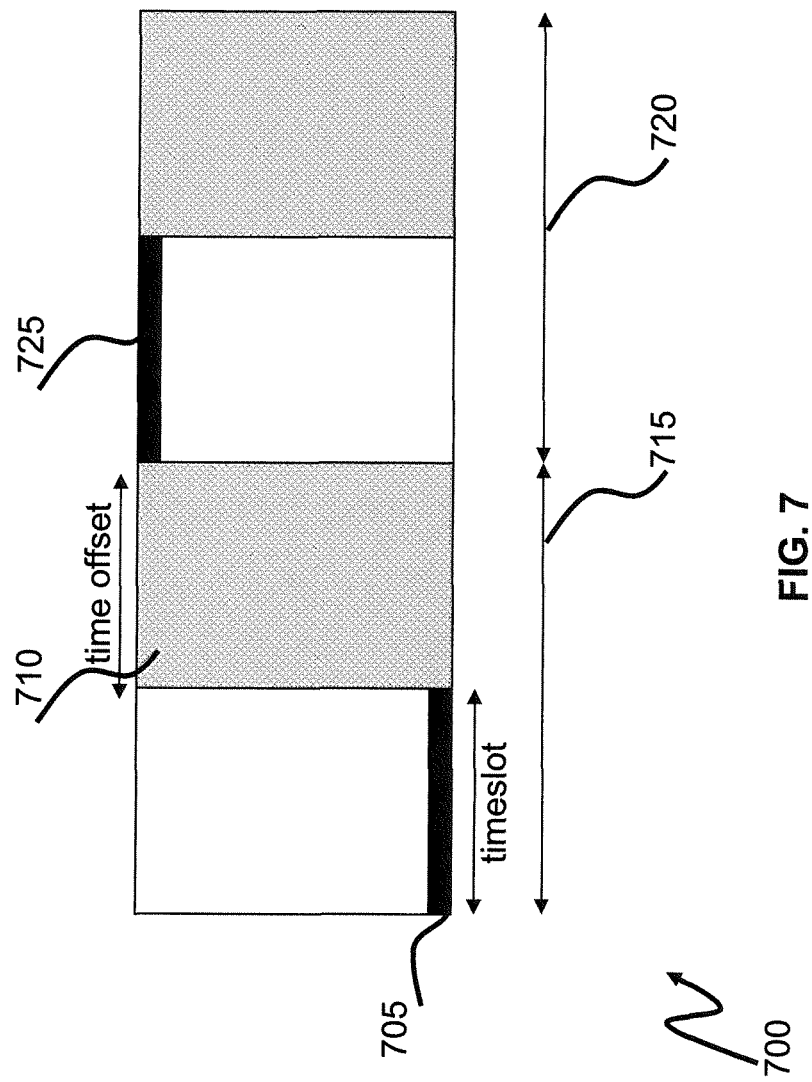
FIG. 7 illustrates PUCCH operation for a low bandwidth UE according to an example embodiment of the invention.

FIG. 7 illustrates PUCCH operation 700 for a low bandwidth UE, according to an example embodiment of the invention. In this example embodiment, a PUCCH signal is sent using a set of low frequency subcarriers 705 in a first timeslot of a sub-frame 715. In the first timeslot of a next (second) sub-frame 720, the PUCCH signal is sent using a set of high frequency subcarriers 725. In this manner, the PUCCH signal is transmitted across two sub-frames with a time offset (comprising the second timeslot of the first sub-frame) 710 between them. This time offset (gap) 710 of a time-multiplexed scheme allows a low frequency UE to re-tune its synthesisers and other RF circuitry before the first timeslot of the next (second) sub-frame 720. By inserting a switching time between the time at which the low bandwidth UE needs to transmit on the set of low frequency subcarriers and the time at which it needs to transmit on the set of high frequency subcarriers, the low bandwidth UE is able to transmit PUCCH using the same physical resources as those used by legacy full bandwidth UEs. Since the same physical resources are used, there is no need for separate PUCCH resources 176 for the uplink virtual carrier: this removes the problem of the fragmentation the host carrier bandwidth, as illustrated in the prior art of FIG. 1.

As will be appreciated, the above approach is also compatible with the PUCCH signalling format expected by legacy UEs utilising the 3GPP™ standard, in that UEs both according to this invention and legacy UEs are able to transmit in subcarriers anywhere within the entire host carrier bandwidth. Due to its ability to operate in a wide system bandwidth, a legacy UE does not need to re-tune its RF circuits between transmission of the initial low frequency subcarriers of the PUCCH signal 705 and the subsequent high frequency subcarriers of the PUCCH signal 725. A skilled artisan will appreciate that PUCCH can also be transmitted using high frequency subcarriers in a first timeslot and low frequency subcarriers in a second timeslot and that the example embodiment illustrated in FIG. 7 can be straightforwardly adapted to PUCCH operating in such a mode.

Figure 1:
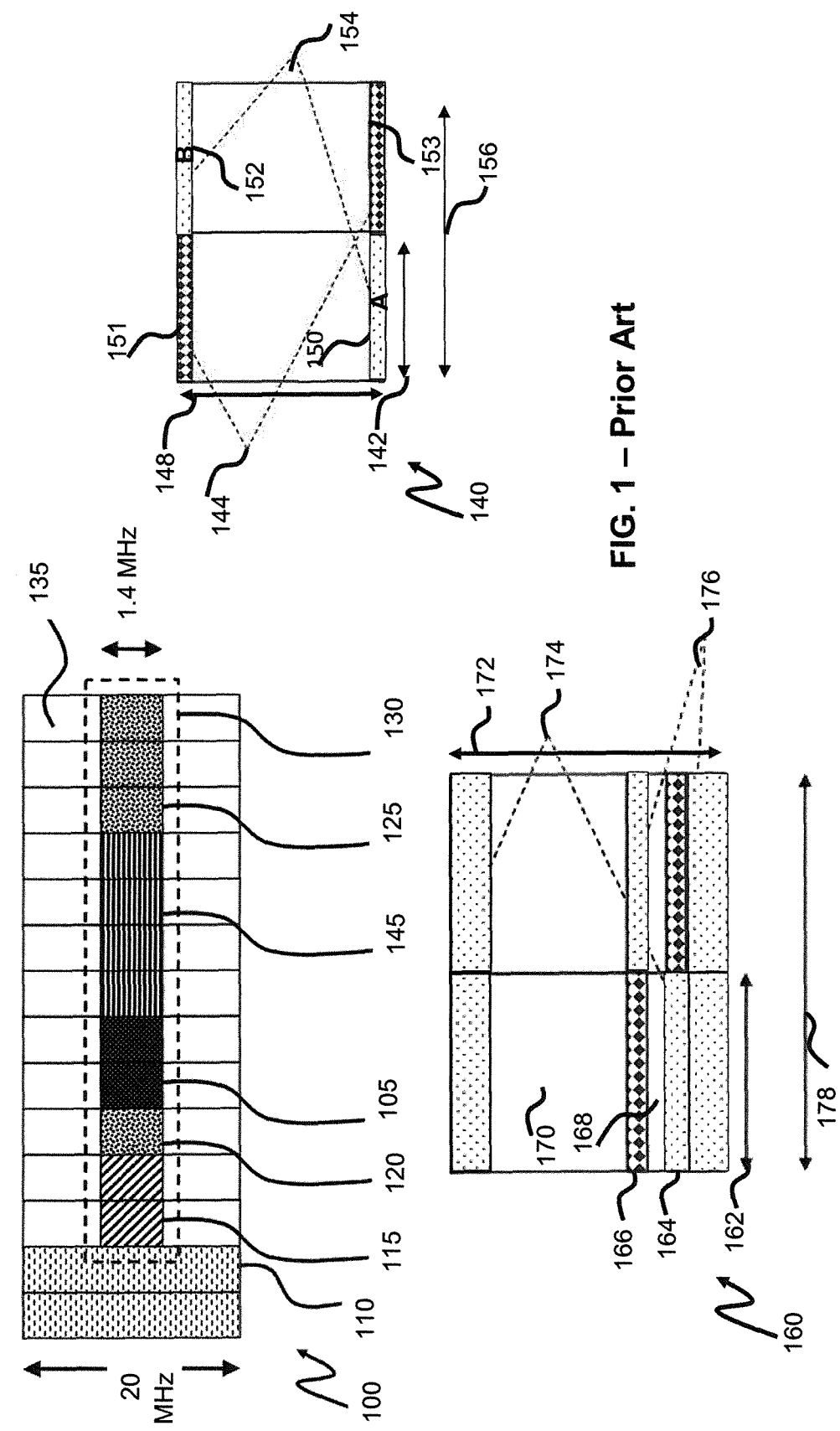
FIG. 1 illustrates schematic examples of a known host carrier and virtual carrier arrangement.

By introducing a blank timeslot 710, a low bandwidth UE is able to transmit frequency distributed PUCCH signals using the same physical resources as used by PUCCH according to current 3GPP releases (up to Release-10), without having to fragment the host carrier bandwidth, thereby providing an improvement over the prior art in FIG. 1, for example.

Figure 8:
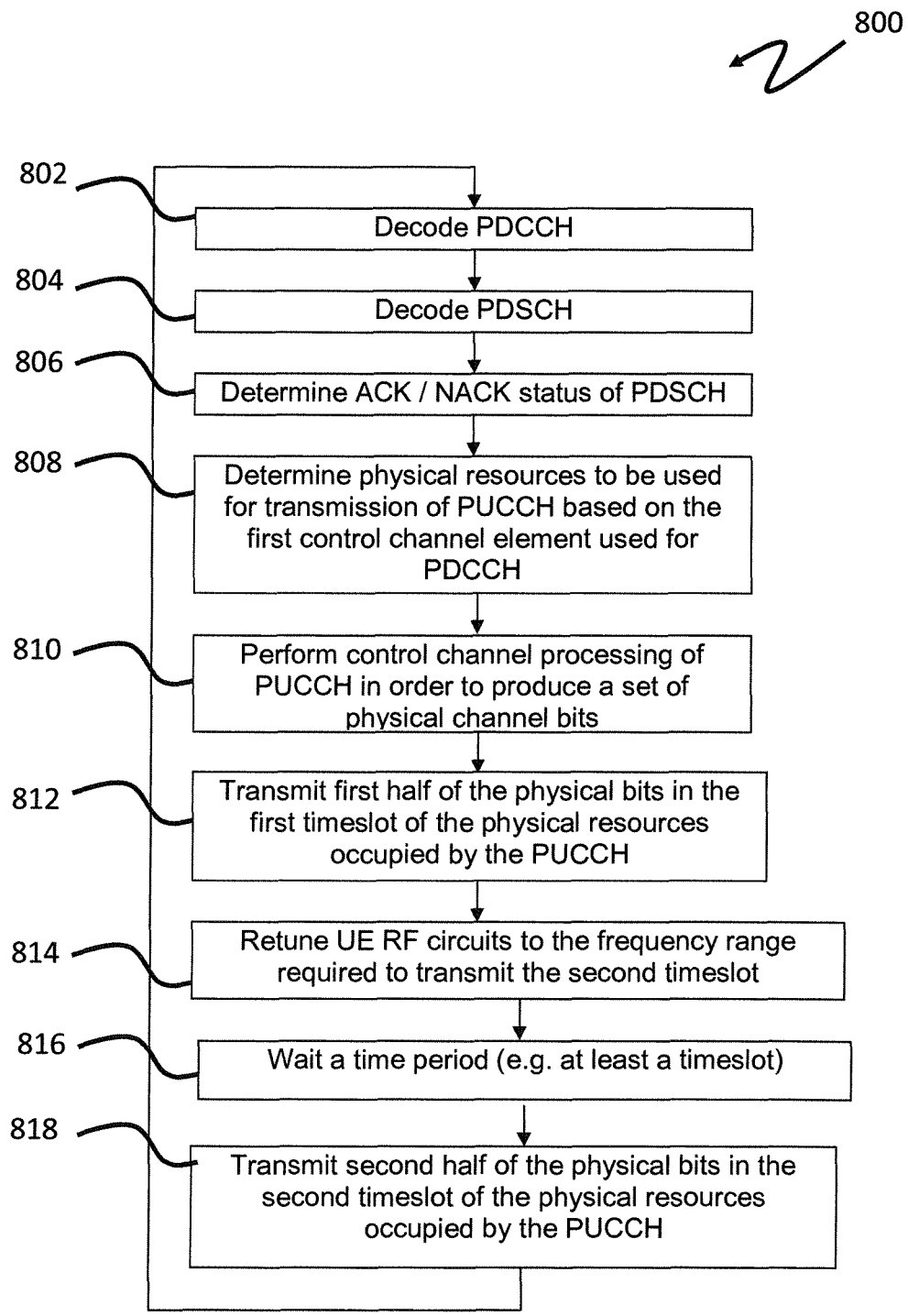
FIG. 8 illustrates a flowchart of a UE operation according to an example embodiment of the invention.

FIG. 8 illustrates a low bandwidth UE operation 800, according to an example embodiment of the invention. Initially, the UE receives and decodes the physical downlink control channel (PDCCH) and physical downlink shared channel (PDSCH) in 802, 804, and determines the acknowledgement ACK or negative acknowledgement NACK status of the PDSCH in 806. The UE then determines what physical resources to use for transmission of a physical uplink control channel (PUCCH) signal based on the first control channel element used for PDCCH, as shown in 808. Alternatively, the UE may be semi-statically assigned some PUCCH resources to use for feedback signalling to the eNodeB, where the feedback signalling could for example consist of ACK/NACK indications, channel quality indications (CQI), etc. The UE then performs control channel processing of PUCCH in order to produce a set of physical channel bits in 810. In this example embodiment, control channel processing refers to the steps required to convert the information to be transmitted on PUCCH into a bit stream. In this example embodiment, format 1a, as known in the art, is used for control channel processing, entailing multiplying a sequence of twelve complex numbers by an input bit, wherein the input bit is a representation of an ACK/NACK status, and scrambling and spreading by a factor of '4'. In other examples other formats may be used.

The UE then transmits a first half of the physical bits in a first timeslot of the physical resources occupied by PUCCH, say in a set of low frequency subcarriers in 812 and then re-tunes, in 814, its radio frequency (RF) and frequency generation circuits to a desired second frequency, e.g. a frequency suitable for transmitting PUCCH in a set of high frequency subcarriers. The UE then waits in 816 a time period, for example at least a timeslot, such that the time period and any re-tuning time is, say, substantially equal to the introduced time gap as mentioned earlier. The UE then transmits a second half of the physical bits in the first timeslot of the next sub-frame of the physical resources occupied by the PUCCH using that set of high frequency subcarriers, as shown in 818.

In this example embodiment, the UE only transmits an ACK/NACK on the PUCCH. However, in another example embodiment, the UE may be configured to transmit channel quality indications (CQI), for example. In some examples, the PUCCH may be semi-statically allocated to the UE.

Figure 9:
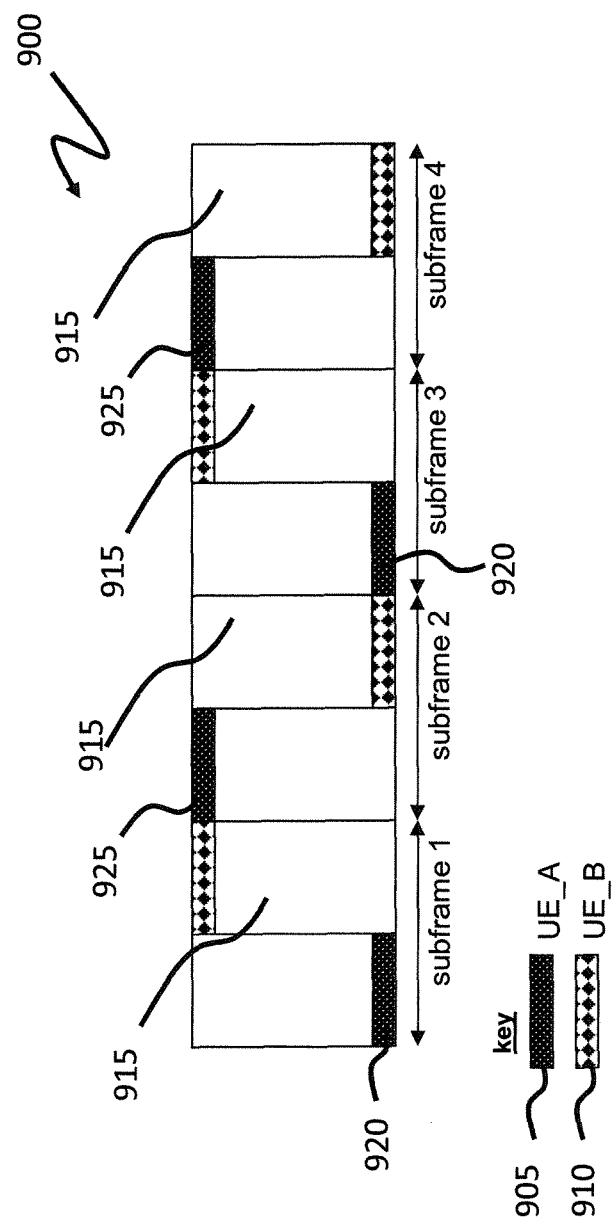
FIG. 9 illustrates a schematic diagram of 'grouped' scheduling of PUCCHs according to an example embodiment of the invention.

FIG. 9 illustrates a schematic diagram of 'grouped' scheduling of PUCCHs, according to an example embodiment of the invention. This illustrated example embodiment comprises a plurality of sub-frames '1'-'4', wherein each sub-frame comprises PUCCH signals for UE_A 905 and PUCCH signals for UE_B 910 in anti-phase with each other. In this example embodiment, low frequency signals and high frequency signals for UE_A 905 and UE_B 910 are separated by at least one timeslot. For example, the PUCCH signal for UE_A 905 has its low frequency signal 920 separated from its high frequency signal 925 by timeslot 915. Thus, each low frequency and high frequency signal for UE_A 905 and UE_B 910 are separated by at least one timeslot 915.

In this example embodiment, previously blank timeslot 710 of FIG. 7, denoted 915 in this example embodiment, has been utilised by 'grouping' a further PUCCH signal for UE_B 910 in this timeslot 915 in anti-phase with a PUCCH signal UE_A 905. As discussed above, it is desirable to have a time-offset, blank second timeslot 915, between the low frequency portion of the PUCCH for UE_A 920 and the high frequency portion of the PUCCH for UE_A 925. This blank second timeslot 915 provides a low bandwidth UE with a defined amount of time to re-tune its synthesisers and other RF circuitry during the blank second timeslot 915.

In order to make efficient use of bandwidth, it is desirable to 'group' the PUCCH signal for UE_B 910 in the previously blank second timeslot 915. As UE_B 910 is in anti-phase with UE_A 905, the PUCCH signals for low bandwidth UE_A 905 and UE_B 910 can be easily distinguished by the eNodeB. In this example embodiment up to four different PUCCH signals can be 'grouped' within the timeslots, because in the first sub-frame of FIG. 9 the high subcarriers in the first timeslot of sub-frame 1 have not been considered. For example, a set of subcarriers is able to support more than one PUCCH through code multiplexing onto those subcarriers (using, say, spreading and scrambling techniques). The grouping of UE_A 905 and UE_B 910 supports backwards compatibility and efficient resource usage when low bandwidth UEs operate in the same network as high bandwidth UEs of existing or potentially future Releases, e.g. Release 8-10 UEs.

In any one sub-frame, the resources used by the group of UEs (UE_A 905 and UE_B 910) are identical to the set of resources used by a single UE, as illustrated in 140 of FIG. 1. This allows for coexistence and efficient resource usage. If two UEs are not grouped as in FIG. 9, only the first timeslot would be used as the upper subcarriers of the second timeslot could not be assigned to another UE, if that other UE was a high bandwidth legacy UE.

When PUCCH signals are allocated to low bandwidth UEs in a semi-static manner (for example for the transmission of CQI information), groups of low bandwidth UEs are created such that the physical resources (e.g. cyclic shifts of the Zaddoff-Chu sequence) may be fully utilised in all timeslots in both the upper and lower sets of sub-carriers.

In the example embodiment of FIG. 9, the 'groups' of UEs comprise paired UEs. In other example embodiments, the 'groups' of UEs may comprise time-multiplexed UEs, where 'time-multiplexed UEs' encompasses a scenario where there are certain UEs that are labelled as type A and other UEs as type B, but that one particular UE of type A is not always allocated with one other particular UE of type B. In this example embodiment, each UE PUCCH signal occurs in the same relative timeslot for each subsequent sub-frame. This is determined by the position of the other 'paired' UE PUCCH signal, as each 'paired' PUCCH signal appears in anti-phase with the other 'paired' PUCCH signal.

Figure 10:
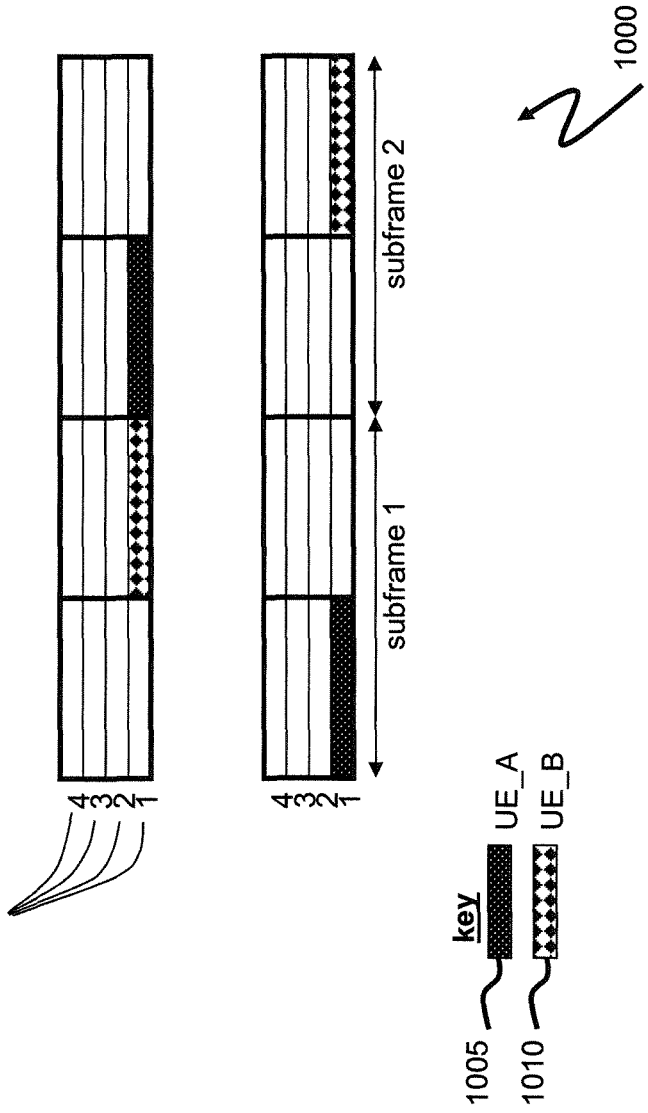
FIG. 10 illustrates a schematic of semi-statically assigned PUCCH resources for 'grouped' UEs according to an example embodiment of the invention.

FIG. 10 illustrates a schematic of semi-statically assigned PUCCH resources for grouped UEs, according to an example embodiment of the invention. In this illustrated example, when PUCCH is inherently allocated through previous allocations of PDSCH via PDCCH signalling, the relationship between PDCCH and PUCCH needs to be defined. For example, the grouped UEs are configured to transmit either UE_A PUCCH 1005 or UE_B PUCCH 1010, as illustrated in FIG. 10. When PDSCH is allocated for one of the UEs (either UE_A or UE_B), it is automatically allocated for the second UE (UE_B or UE_A). The PDSCH allocation for UE_A 1005 could be defined explicitly by allocation signalling within the PDCCH. The PDSCH allocation for UE_B 1010 could be a known offset from that for UE_A 1005. For example, UE_B 1010 may be allocated with PDSCH resource that are subcarrier multiplexed with the subcarriers applied to the PDSCH resources for UE_A 1005 (where subcarrier multiplexing encompasses at least a use of subcarriers that are offset in the subcarrier domain from other subcarriers. For example, the PDSCH resources for UE_B 1010 may be subcarrier multiplexed with the PDSCH resources for UE_A 1005 by assigning the subcarriers of the PDSCH resources for UE_B 1010 to be adjacent in the subcarrier domain to the subcarriers of the PDSCH resources for UE_A 1005), or could be allocated the same physical resources as UE_A 1005, but in the subsequent sub-frame. The modulation and coding scheme for UE_B 1010 may be explicitly signalled within the PDSCH.

For some MTC applications, traffic may be predictable and, therefore, automatic allocation of resources, as above, may be appropriate. In other MTC applications, traffic may be delay tolerant, and, thus, it may be acceptable to delay downlink transmission to one of the UEs until downlink traffic for the other UE is also available. In some examples, automatic allocation of resources in such cases may also be appropriate.

If the network is lightly loaded, it is possible to allocate physical resources to both UE_A 1005 and UE_B 1010 of the group, even if data only exists for one UE in the group, since in a lightly loaded network there is no penalty associated with assigning physical resources to a UE and then not using those physical resources to transfer higher layer data.

In the example embodiment of FIG. 10, the 'groups' of UEs consist of paired UEs. In other example embodiments, the 'groups' of UEs may comprise time-multiplexed UEs, where again 'time-multiplexed UEs' encompasses a scenario where there are certain UEs that are of type A and other UEs of type B, but that one particular UE of type A is not always allocated with one other particular UE of type B. In this example embodiment, each UE PUCCH signal occurs in the same relative timeslot for each subsequent sub-frame. The selection of the different subdivisions of a frequency resource (e.g. different cyclic shifts of a Zadoff Chu base sequence) is determined by the position of the other 'paired' UE PUCCH signal, as each 'paired' PUCCH signal appears in anti-phase with the other 'paired' PUCCH signal.

Although the example of FIG. 10 is described showing four cyclic shift options per timeslot, it is envisaged that in other examples of the invention more cyclic shift options per timeslot may be employed. Furthermore, in other examples of the invention, the concepts herein described may be applied to more timeslots per sub-frame or frames or multiframes.

Figure 11:
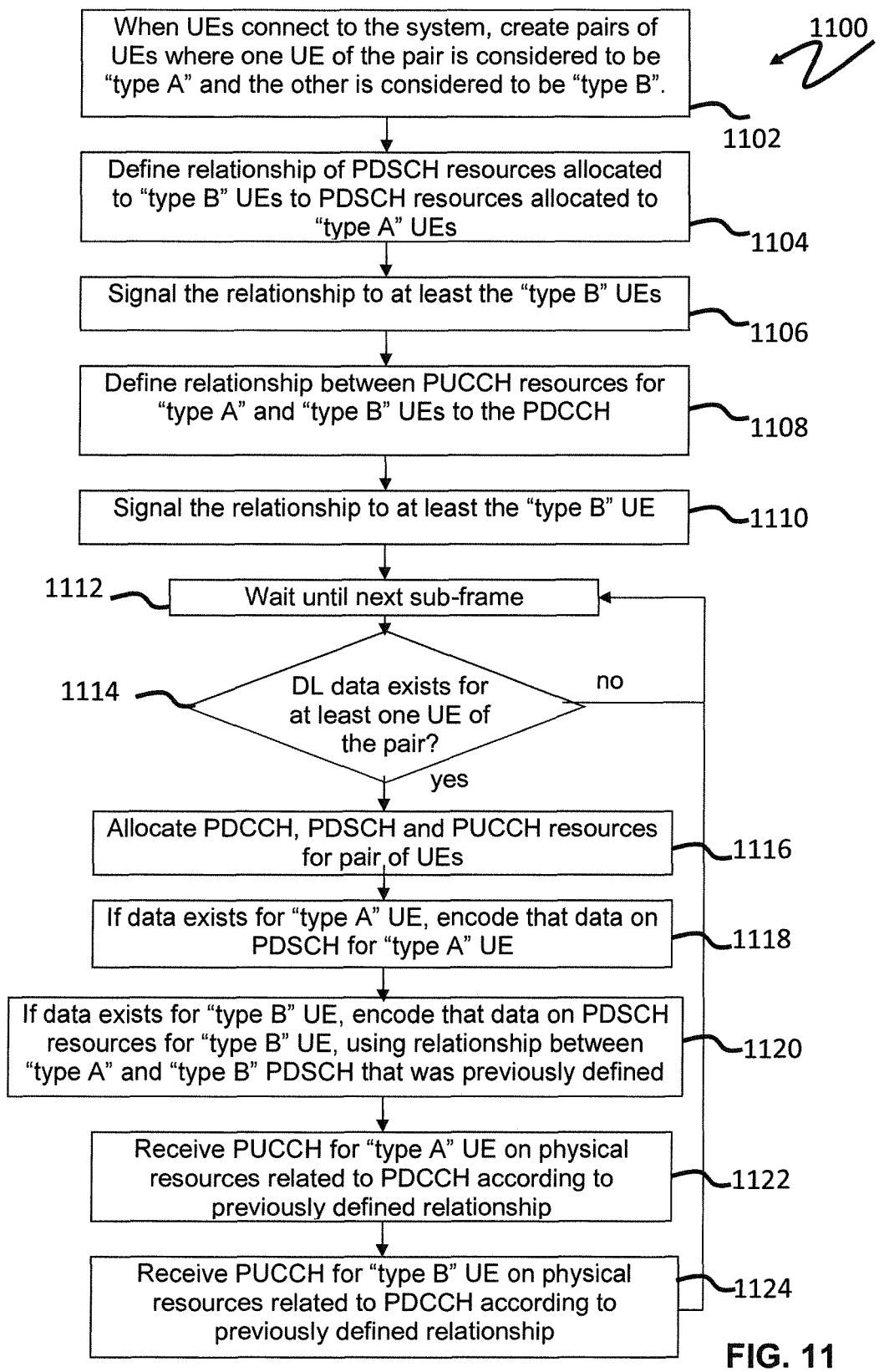
FIG. 11 illustrates a flow chart of eNodeB operation for 'grouped' UEs according to an example embodiment of the invention.

FIG. 11 illustrates a flowchart 1100 of an eNodeB operation for scheduling 'grouped' UEs, according to an example embodiment of the invention. The example flowchart 1100 assumes that PUSCH has not been assigned to the UE (to allow the UE to transmit an ACK/NACK for the PDSCH using that PUSCH) and that the ACK/NACK indication is hence transmitted using PUCCH. Initially, when UEs connect to the system, the eNodeB creates 'groups' (which in some examples may be pairs) of UEs where one UE of the group is considered to be 'type A' and the other is considered to be 'type B'(depending on factors such as the amount of time needed to switch a UE's RF circuits between two frequencies, further UEs may be considered to be 'type C', 'type D' etc.), as shown in 1102. The eNodeB then defines a relationship between PDSCH resources allocated, say, to 'type B' UEs and PDSCH resources allocated to 'type A' UEs in 1104, and signals the relationship to at least the 'type B' UEs in 1106. The eNodeB then defines a relationship between PUCCH resources for 'type A' and 'type B' UEs to the PDCCH in 1108, and signals the relationship to at least the 'type B' UEs in 1110. For example, PUCCH resources for 'type B' UEs could be defined as occupying the timeslot after the resources for the 'type A' UEs and using the subcarriers at the opposite end of the carrier to those used for 'type A' UEs.

In an alternative embodiment, the relationship between PDSCH resources for 'type A' UEs and the PDSCH resources for 'type B' UEs may be known a priori; furthermore the relationship between PUCCH resources for 'type A' UEs and the PUCCH resources for 'type B' UEs may be known a priori. The eNode B, or other network node, may determine that a UE is 'type A' or 'type B'; alternatively UEs could be determined a priori to be of 'type A' or 'type B', for example based on their International Mobile Equipment Identity (IMEI) or based on subscription information stored on a subscriber identity module (SIM).

The eNodeB then waits until the next sub-frame in 1112 before determining whether or not downlink data exists for at least one UE of the group (or pair) in 1114. If downlink data does not exist for at least one UE of the group (or pair) in 1114, the eNodeB again waits for the next sub-frame. However, if downlink data does exist for at least one UE of the group (or pair) in 1114, the eNodeB allocates PDCCH, PDSCH and PUCCH resources for the group of UEs in 1116 according to the aforementioned scheduling approach. If the eNodeB determines that data exists for 'type A' UEs, the eNodeB encodes that data on PDSCH for 'type A' UEs in 1118. In 1120, if the eNodeB determines that data exists for 'type B' UEs, the eNodeB encodes that data on PDSCH resources for 'type B' UEs, using the relationship between 'type A' and 'type B' PDSCH that was defined previously. In 1122 the eNodeB then receives PUCCH for 'type A' UEs on physical resources related to PDCCH according to the previously defined relationship. In 1124, the eNodeB then receives PUCCH for 'type B' UEs on physical resources related to PDCCH according to the previously defined relationship. In some examples, it is noted that there may be some delay between 1120 and 1122 to allow the UEs to decode PDSCH and encode PUCCH.

In the example embodiment of FIG. 11, the 'groups' of UEs comprise of paired UEs. In other example embodiments, the 'groups' of UEs may comprise time-multiplexed groups of more than two UEs where each UE's PUCCH signal may occur in the same relative timeslot for each subsequent sub-frame, but located in a different set of subcarriers (such as low, medium or high frequency subcarriers). In the paired example embodiment, each UE's PUCCH signal may occur in the same relative timeslot for each subsequent sub-frame, but located at a different carrier frequency (such as a low or high frequency). This low versus high carrier frequency pairing or grouping for low bandwidth UEs may be determined by the position of the other 'paired' (or grouped) UE PUCCH signal, as each 'paired' PUCCH signal appears in anti-phase with the other 'paired' PUCCH signal.

Figure 12:
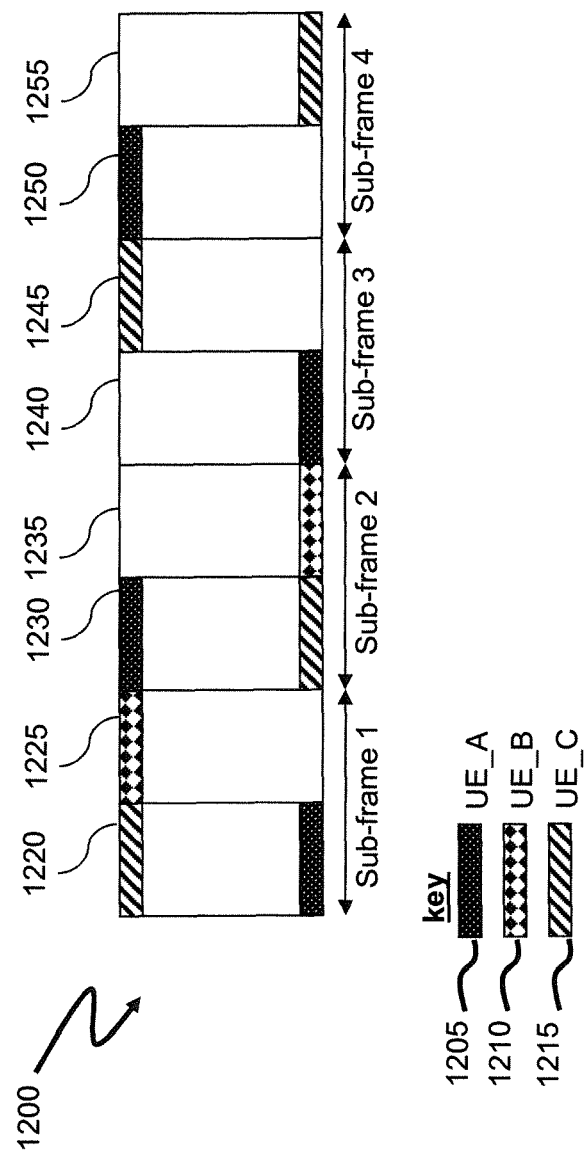
FIG. 12 illustrates a further schematic diagram of 'grouped' scheduling of PUCCHs according to an example embodiment of the invention.

FIG. 12 illustrates an example schematic diagram 1200 of scheduling of PUCCHs for a first UE (UE_A) 1205, a second UE (UE_B) 1210 and a third UE (UE_C) 1215, according to an example embodiment of the invention. In the time-multiplexed mode of operation shown in the example schematic diagram 1200, the PUCCH resources that the UEs are assigned to may appear similar to the PUCCH resources (e.g. sub-frame or timeslot) assigned in the 'grouping' mode of operation illustrated in FIG. 9. However, the scheduler (not shown) has a greater degree of freedom in this example with regard to which UEs to schedule to a particular PUCCH resource. Thus, in this example embodiment and in contrast to the scheduling of FIG. 11 relating to 'pairing' of PUCCH signals, the scheduler does not automatically schedule a paired UE when the other UE of the pair is scheduled. Thus, in this example embodiment, UE_A has been paired with UE_B in sub-frame 1 and sub-frame 2, but in sub-frame 3 and sub-frame 4 UE_A has been paired with UE_C, rather than with UE_B.

For example, in sub-frames one and two, UE_A 1205 is time-multiplexed with UE_B 1210 between respective first timeslots 1220, 1230 and second timeslots 1225, 1235 of the respective sub-frames. However, in sub-frames three and four, UE_A 1205 is time-multiplexed with UE_C 1215 between respective first timeslots 1240, 1250 and second timeslots 1245, 1255 of the respective sub-frames. Therefore, in this example embodiment, it is possible to alter the pairing of PUCCHs between different sub-frames.

In an example embodiment, the actual PUCCH that the UE uses can be semi-statically configured by radio resource control signalling.

In a further example embodiment, the PUCCH that the UE uses may be arranged to be a function of the index of the first control channel element (CCE) used to transmit the PDCCH that allocates some PDSCH resource. This example may be employed where the PUCCH is required to report acknowledgement/negative acknowledgement (ACK/NACK) information on a PDSCH that was previously allocated to the UE.

In a further example embodiment, where the PUCCH is a function of the first control channel element (CCE) used to transmit the PDCCH, a new mapping between PDCCH and PUCCH may be defined. This new mapping can be applied only to the low bandwidth UEs to which this invention applies.

In this example embodiment, as per Release-10 LTE, the PUCCH that the UE shall use is defined by the first CCE that is occupied by the PDCCH. PDCCHs with some first CCEs are associated with 'type A' PUCCH and others are associated with a 'type B' PUCCH. The UE transmits a 'type A' PUCCH or a 'type B' PUCCH depending on the first CCE used for the PDCCH. Low bandwidth UEs are allocated PDCCH with consideration for the PUCCH resources (type 'A' or 'type B') that they shall use. Legacy UEs can be allocated using the legacy mapping rules between PDCCH and PUCCH as per Release-10. The scheduler (not shown) manages the assignment of PUCCH as a function of UE type and of the first CCEs used for the PDCCH.

Figure 13:
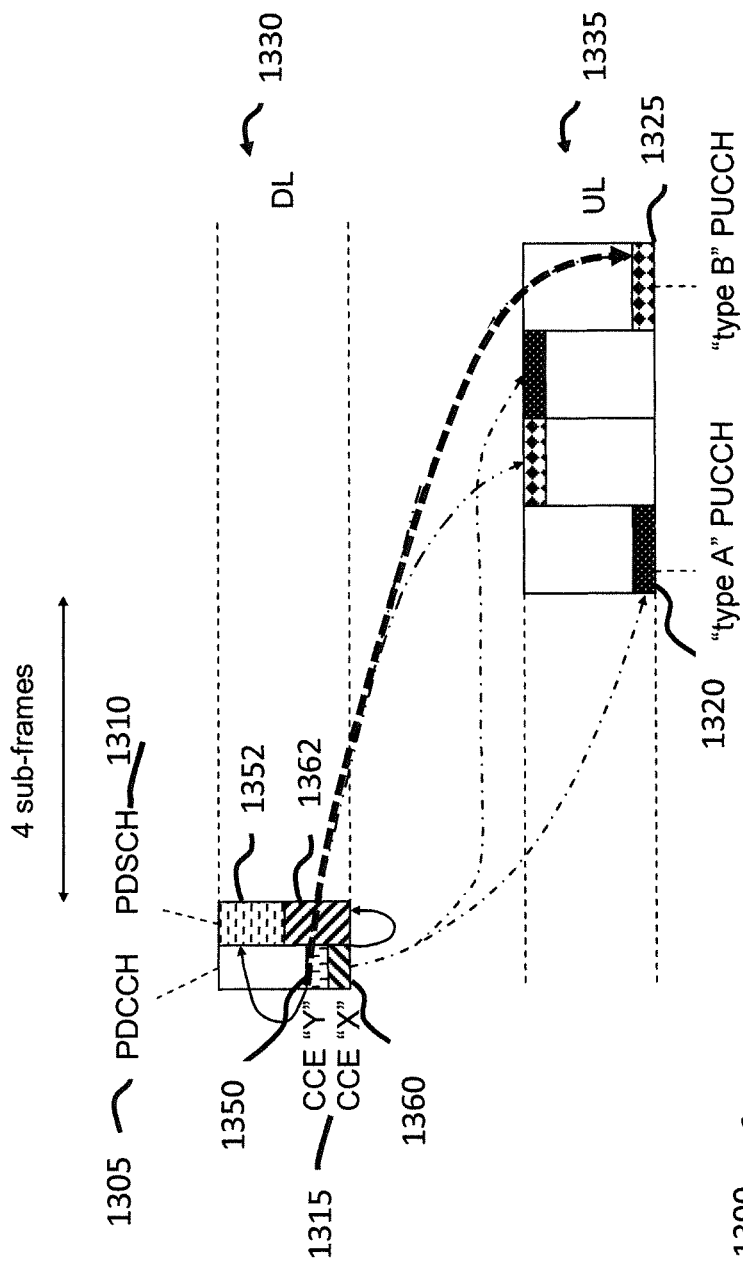
FIG. 13 illustrates a schematic diagram of mapping between PDCCH and PUCCH according to an example embodiment of the invention.

FIG. 13 illustrates a schematic diagram 1300 of the scheduling of PDCCH 1305 and PDSCH 1310 on a downlink carrier 1330 and the scheduling of different example types of PUCCHs on a corresponding uplink carrier 1335 according to an example embodiment of the invention. In one example, it is assumed that a PDCCH 1305 whose first CCE 1315 occupies a first resource 'X' 1360 maps to a specific type of PUCCH, for example 'type A' PUCCH 1320, and that a PDCCH 1305 whose first CCE occupies a second resource 'Y' 1350 maps to a specific type of PUCCH, for example 'type B' PUCCH 1325. This figure also shows that PDCCH 1305 allocates PDSCH 1310 resources (noting that the PUCCH 1320, 1325 may carry the ACK/NACK for the PDSCH 1310).

Figure 14:
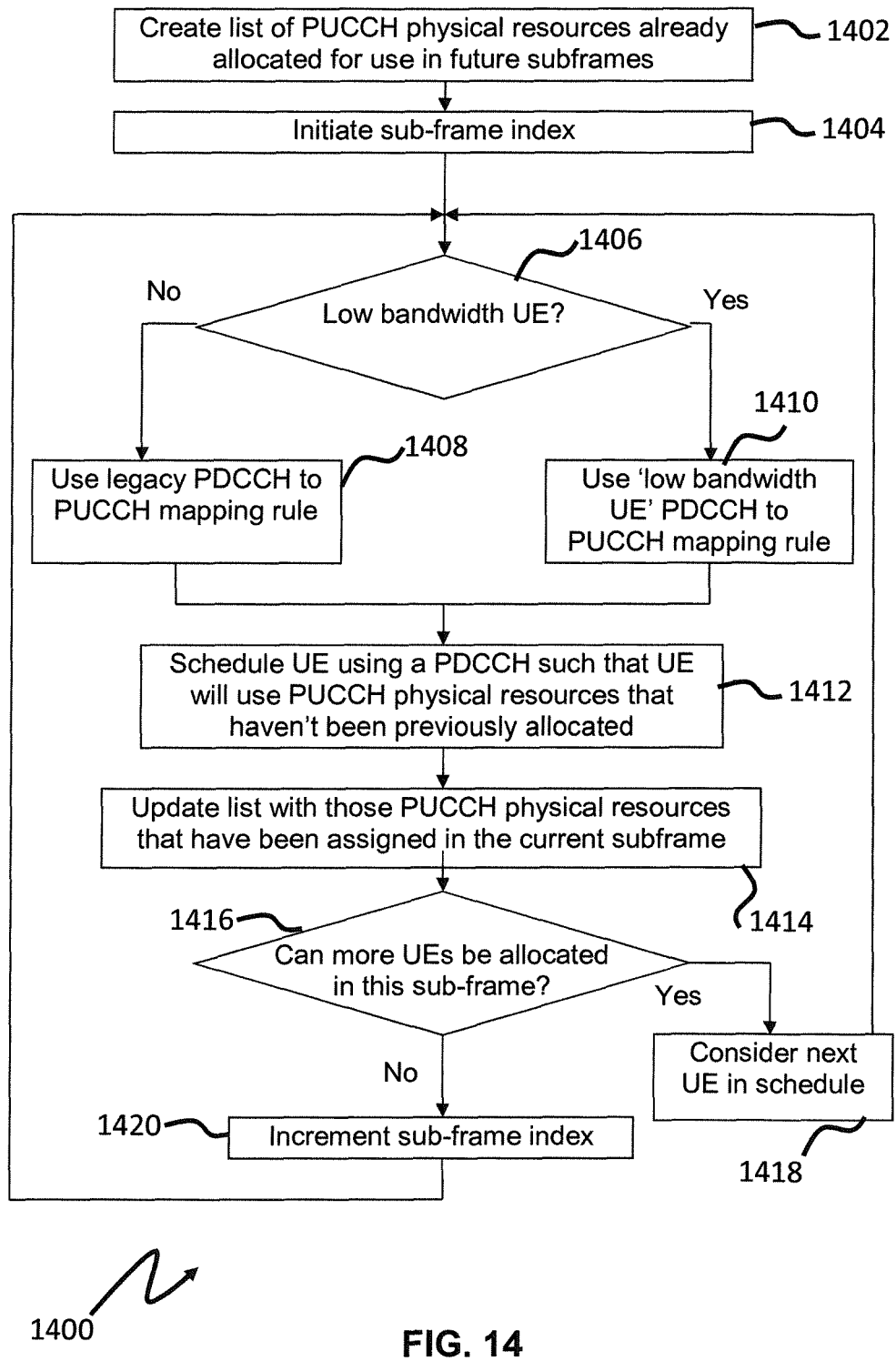
FIG. 14 illustrates a flow chart of eNodeB scheduling of PDSCH to UEs according to an example embodiment of the invention.

FIG. 14 illustrates a flowchart 1400 of an eNodeB scheduling of PDSCH to UEs, according to an example embodiment of the invention. This example embodiment relates to the case where PUCCHs are time-multiplexed, and applies to both low bandwidth UEs and to legacy UEs. In this example, it is assumed that when PDCCH allocates PDSCH (there is an implication that there then follows a PUCCH), there is a one-to-one mapping between the first control channel element used for the PDCCH (that allocates PDSCH) and the PUCCH that is associated with the PDSCH. Hence, in this example, selecting a PUCCH to be used is inherently linked with selecting a PDCCH.

Initially, the eNodeB creates a list of PUCCH physical resources already allocated for use in future sub-frames in 1402, and initiates a sub-frame index in 1404. The eNodeB then determines in 1406 as to whether the UE to be scheduled is a low bandwidth UE or a legacy UE. If the eNodeB determines that the UE to be scheduled is a low bandwidth UE, the eNodeB uses a low bandwidth UE PDCCH to PUCCH mapping rule, as shown in 1410. If the eNodeB determines that the UE to be scheduled is a legacy UE, the eNodeB uses a legacy PDCCH to PUCCH mapping rule, as shown in 1408.

The eNodeB then schedules the UE using a PDCCH, such that the UE will use PUCCH physical resources that have not been previously allocated in 1412. This process is required when PDCCH allocates PDSCH with the implication that there then follows a PUCCH. This is because in Release-10, there is a one-to-one mapping between the first control channel element used for the PDCCH, which allocates PDSCH, and the PUCCH that is associated with the PDSCH. Therefore, choosing a PUCCH to be used is linked with choosing a PDCCH. Furthermore, use of a certain PDCCH in a sub-frame 'n' may not be possible when a certain other PDCCH was used in a sub-frame 'n−1' and the PUCCHs associated with those PDCCHs may clash in a future sub-frame in the uplink.

The eNodeB then updates a list with those PUCCH physical resources that have been assigned on the current sub-frame, as shown in 1414. The eNodeB then determines whether more UEs can be allocated in the current sub-frame in 1416. In one example, this decision depends upon whether PDCCH, PUCCH and PDSCH are available. However, assuming there is the availability of PDCCH, PUCCH and PDSCH, the eNodeB considers the next UE in the schedule in 1418, if it determines that more UEs can be allocated in the sub-frame. Otherwise, the eNodeB increments the sub-frame index in 1420. Following either 1418 or 1420, the eNodeB returns to 1406 to determine whether the next UE in the schedule is a low bandwidth UE. It is noted in this example, that the use of a certain PDCCH in sub-frame 'n' may not be possible when a certain other PDCCH was used in sub-frame 'n−1' and the PUCCHs associated with those PDCCHs may clash in a future sub-frame (in the UL).

In one example, it is possible that PUCCH resources can be semi-statically assigned to UEs for the purposes of periodic CQI reporting. In such a semi-static case, the PUCCHs to be used by different UEs, for example a mix of low bandwidth and legacy UEs, may be decided when UEs connect to the system and those PUCCH resources would not change with time, unless the UE is re-configured using well known re-configuration procedures.

Although examples have been described showing sub-frames with two timeslots, it is envisaged that in other examples of the invention more timeslots per sub-frame may be employed, so long as sufficient switching and re-tuning time is provided for the low bandwidth wireless communication units. Furthermore, in other examples of the invention, the concepts herein described may be applied to frames or multiframes.

Although examples have been described showing a time offset 710 of a single timeslot, it is envisaged that in other examples, more than one timeslot or fractions of a timeslot may be employed as a time offset.

Thus, in some example embodiments, low bandwidth wireless communication units (e.g. UEs) may now be able to operate within a high bandwidth carrier without fragmenting the contiguous uplink resource available in the high bandwidth carrier. Furthermore, in some example embodiments, with a provision of a time gap between the UE having to transmit on some subcarriers and then having to transmit on another set of subcarriers, the use of UEs with a restricted bandwidth within a higher bandwidth carrier may be supported. In addition, in some example embodiments, UEs may be paired such that they operate in anti-phase. In some example embodiments, UEs may not be paired and may be scheduled to use different PUCCH resources (for example according to the aforementioned 'time-multiplexed' scheme). In some example embodiments, when UEs are paired, and the application is delay tolerant, the pair of UEs may be scheduled either when downlink traffic exists for both UEs (which may entail buffering of traffic for the earlier UE until data appears for the later UE); or when there is spare resource within the sub-frame due to, for example, a lull in the amount of traffic being offered to the system.

It will be appreciated that, for clarity purposes, the above description has described embodiments of the invention with reference to different functional units and processors. However, it will be apparent that any suitable distribution of functionality between different functional units or processors can be applied, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality. For example, for clarity the control processor 296 and signal processor 308 have been illustrated and described as a single processing module, whereas in other implementations it may comprise separate processing modules or logic blocks.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A network element for controlling a usage of at least one resource, wherein the network element comprises:
a transmitter for transmitting a signal identifying at least one uplink resource to at least one wireless communication unit;
a signal processor operably coupled to the transmitter for generating the signal; and
a receiver for receiving a transmission from the at least one wireless communication unit on the identified at least one uplink resource,
wherein the signal processor is arranged to:
allocate the uplink resource for the at least one wireless communication unit in a first portion of a first sub-frame on a first frequency and a first portion of a second sub-frame on a second frequency wherein a time gap is allocated between an end of the first portion of the first sub-frame and a beginning of the first portion of a second sub-frame;
group a plurality of wireless communication units by assigning a type to the wireless communication unit;
define a relationship between the plurality of wireless communication units for use of at least two types of physical downlink shared channel, PDSCH, resource wherein a first type of PDSCH resource occupies a first subcarrier and a second type of PDSCH resource is subcarrier multiplexed with the first type of PDSCH resource; and
assign a resource to the wireless communication unit type based at least partly on the defined relationship.

2. The network element of claim 1, wherein the time gap between the first portion of the first sub-frame and the first portion of the second sub-frame is arranged to be sufficient to enable the at least one wireless communication unit to switch operation from the first frequency to the second frequency.

3. The network element of claim 1, wherein the signal processor generates a first signal allocating a first uplink resource for transmission to a first wireless communication unit and generates a second signal allocating a second uplink resource for transmission to a second wireless communication unit.

4. The network element of claim 1 wherein the signal processor is further arranged to assign a resource to the wireless communication unit type based at least partly on one of the following:
where a relationship between at least one resource for a first wireless communication unit type and a second wireless communication unit type are known a priori;
where the signal processor is arranged to define a relationship between the plurality of wireless communication units for use of at least one uplink control channel (PUCCH) resource.

5. The network element of claim 4 wherein the transmitter transmits the relationship to the plurality of wireless communication units.

6. The network element of claim 4 wherein the at least one uplink control channel resource comprises at least two types of physical uplink control channels (PUCCH) resource wherein a first type of PUCCH resource occupies a first timeslot of a sub-frame and a second type of PUCCH resource occupies a second timeslot of the sub-frame.

7. The network element of claim 6 wherein the signal processor is arranged to allocate more than one wireless communication units on the first type of PUCCH resource by assigning different cyclic shifts of a sequence to respective wireless communication units.

8. The network element of claim 7 wherein the different cyclic shifts of a sequence comprise different cyclic shifts of a Zadoff-Chu sequence.

9. The network element of claim 6, wherein the signal processor allocates a first type of PUCCH resource to at least two wireless communication units such that the at least two wireless communication units are allocated the same relative timeslot for each subsequent sub-frame from a first set of subcarriers, and wherein the signal processor allocates at least one further type of PUCCH resource for at least one further wireless communication unit from a different second set of subcarriers.

10. The network element of claim 1 wherein the at least one downlink resource comprises at least two types of physical downlink shared channel (PDSCH) resource wherein the first type of PDSCH resource occupies a first sub-frame and the second type of PDSCH resource occupies a second sub-frame.

11. The network element of claim 1 wherein the signal processor is further arranged to determine whether or not downlink data exists for the at least one wireless communication unit and allocates the uplink resource for the at least one wireless communication unit based at least partly on determining that data exists for the at least one wireless communication unit.

12. An integrated circuit for a network element for controlling a usage of at least one resource, wherein the integrated circuit comprises:
  a signal processor arranged to:
    allocate an uplink resource for the at least one wireless communication unit in a first portion of a first sub-frame on a first frequency and a first portion of a second sub-frame on a second frequency wherein a time gap is allocated between an end of the first portion of the first sub-frame and a beginning of the first portion of a second sub-frame;
    group a plurality of wireless communication units by assigning a type to the wireless communication unit;
    define a relationship between the plurality of wireless communication units for use of at least two types of physical downlink share channel, PDSCH, resource wherein a first type of PDSCH resource occupies a first subcarrier and a second type of PDSCH resource is subcarrier multiplexed with the first type of PDSCH resource;
    assign a resource to the wireless communication unit type based at least partly on the defined relationship; and
    generate a signal identifying at least one uplink resource for transmission to the at least one wireless communication unit.

13. A method for scheduling at least one resource for use by at least one wireless communication unit, the method comprising, at a network entity:
  allocating at least one uplink resource for the at least one wireless communication unit in a first portion of a first sub-frame on a first frequency and a first portion of a second sub-frame on a second frequency wherein a time gap is allocated between an end of the first portion of the first sub-frame and a beginning of the first portion of a second sub-frame;
  grouping a plurality of wireless communication units by assigning a type to the wireless communication unit;
  defining a relationship between the plurality of wireless communication units for use of at least two types of physical downlink share channel, PDSCH, resource wherein a first type of PDSCH resource occupies a first subcarrier and a second type of PDSCH resource is subcarrier multiplexed with the first type of PDSCH resource;
  assigning a resource to the wireless communication unit type based at least partly on the defined relationship;
  generating a signal identifying the allocated at least one uplink resource;
  transmitting the signal to the at least one wireless communication unit; and
  receiving a transmission from the at least one wireless communication unit on the identified at least one uplink resource.

* * * * *

UNITED STATES PATENT AND TRADEMARK OFFICE
CERTIFICATE OF CORRECTION

| | | |
|---|---|---|
| PATENT NO. | : 9,084,251 B2 | Page 1 of 1 |
| APPLICATION NO. | : 13/719812 | |
| DATED | : July 14, 2015 | |
| INVENTOR(S) | : Martin Warwick Beale | |

It is certified that error appears in the above-identified patent and that said Letters Patent is hereby corrected as shown below:

IN THE CLAIMS:

Column 21, Claim 12, Line 32: Change "share" to -- shared --; and

Column 22, Claim 13, Line 21: Change "share" to -- shared --.

Signed and Sealed this
Twenty-second Day of December, 2015

Michelle K. Lee
*Director of the United States Patent and Trademark Office*